(12) United States Patent
Kuzuhara et al.

(10) Patent No.: US 9,417,430 B2
(45) Date of Patent: Aug. 16, 2016

(54) INNER FOCUS LENS SYSTEM, INTERCHANGEABLE LENS APPARATUS AND CAMERA SYSTEM

(71) Applicant: Panasonic Corporation, Osaka (JP)

(72) Inventors: Satoshi Kuzuhara, Hyogo (JP); Yoshio Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 325 days.

(21) Appl. No.: 13/940,286

(22) Filed: Jul. 12, 2013

(65) Prior Publication Data

US 2014/0022438 A1  Jan. 23, 2014

(30) Foreign Application Priority Data

Jul. 20, 2012  (JP) ................................. 2012-161185
May 9, 2013  (JP) ................................. 2013-099293

(51) Int. Cl.
| | |
|---|---|
| *G02B 13/00* | (2006.01) |
| *G02B 7/14* | (2006.01) |
| *G03B 17/14* | (2006.01) |
| *G02B 15/17* | (2006.01) |
| *G02B 27/64* | (2006.01) |
| *G03B 3/00* | (2006.01) |

(52) U.S. Cl.
CPC .............. *G02B 13/0015* (2013.01); *G02B 7/14* (2013.01); *G02B 15/17* (2013.01); *G02B 27/646* (2013.01); *G03B 17/14* (2013.01); *G03B 3/00* (2013.01); *G03B 2205/0015* (2013.01)

(58) Field of Classification Search
CPC .................. A61K 47/48423; A61K 47/48484; A61K 47/48523; C07K 14/521; C07K 2319/55; G02B 13/0015; G02B 15/17; G02B 27/646; G02B 7/14; G03B 17/14; G03B 2205/0015; G03B 3/00
See application file for complete search history.

(56) References Cited

U.S. PATENT DOCUMENTS

| | | | | |
|---|---|---|---|---|
| 5,627,685 | A * | 5/1997 | Yamanashi | ............ G02B 13/02 359/745 |
| 2004/0070844 | A1* | 4/2004 | Sato | .................... G02B 27/646 359/687 |
| 2009/0190220 | A1* | 7/2009 | Sato | ....................... G02B 13/24 359/557 |
| 2010/0188556 | A1* | 7/2010 | Hirao | ................. G02B 13/0035 348/340 |
| 2011/0279898 | A1* | 11/2011 | Takemoto | ............ G02B 15/173 359/557 |

FOREIGN PATENT DOCUMENTS

| | | |
|---|---|---|
| JP | 01-237611 A | 9/1989 |
| JP | 07-301749 A | 11/1995 |
| JP | 2005-292345 A | 10/2005 |
| JP | 2009-288384 A | 12/2009 |
| JP | 2012-058682 A | 3/2012 |

* cited by examiner

*Primary Examiner* — Amy Hsu
(74) *Attorney, Agent, or Firm* — Renner Otto Boisselle & Sklar, LLP

(57) ABSTRACT

An inner focus lens system comprising a first lens unit and subsequent lens units, wherein the first lens unit: is fixed with respect to an image surface in focusing; and includes a first positive lens element located closest to the object side and a second positive lens element, the subsequent lens units include only a first focusing lens unit located closest to the object side and a second focusing lens unit, at least one of the first focusing lens unit and the second focusing lens unit is composed of two or less lens elements, and the subsequent lens units include an image blur compensating lens unit.

20 Claims, 16 Drawing Sheets

INNER FOCUS LENS SYSTEM, INTERCHANGEABLE LENS APPARATUS AND CAMERA SYSTEM

CROSS-REFERENCE TO RELATED APPLICATION

This application is based on application No. 2012-161185 filed in Japan on Jul. 20, 2012 and application No. 2013-099293 filed in Japan on May 9, 2013, the contents of which are hereby incorporated by reference.

BACKGROUND

1. Field

The present disclosure relates to inner focus lens systems, interchangeable lens apparatuses and camera systems.

2. Description of the Related Art

In interchangeable lens apparatuses, camera systems, and the like, size reduction and performance improvement are strongly required of cameras each including an image sensor for performing photoelectric conversion. Various kinds of lens systems used in such cameras have been proposed.

Japanese Laid-Open Patent Publications Nos. H01-237611, H07-301749, 2005-292345, 2009-288384, and 2012-058682 each disclose an inner focus lens system including: a first lens unit having positive refractive power, which is fixed with respect to an image surface in focusing from an infinity in-focus condition to a close-object in-focus condition; and subsequent lens units.

SUMMARY

The present disclosure provides a compact inner focus lens system having high resolution and excellent performance, in which occurrences of various aberrations are sufficiently suppressed. Further, the present disclosure provides an interchangeable lens apparatus including the inner focus lens system, and a camera system including the interchangeable lens apparatus.

(I) The novel concepts disclosed herein were achieved in order to solve the foregoing problems in the related art, and herein is disclosed:

an inner focus lens system, in order from an object side to an image side, comprising a first lens unit, and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include only a first focusing lens unit located closest to the object side, and a second focusing lens unit, as focusing lens units that move along an optical axis in the focusing, at least one of the first focusing lens unit and the second focusing lens unit is composed of two or less lens elements, and the subsequent lens units include an image blur compensating lens unit that moves in a direction perpendicular to the optical axis to optically compensate image blur.

The novel concepts disclosed herein were achieved in order to solve the foregoing problems in the related art, and herein is disclosed:

an interchangeable lens apparatus comprising:
an inner focus lens system; and
a lens mount section which is connectable to a camera body including an image sensor for receiving an optical image formed by the inner focus lens system and converting the optical image into an electric image signal, wherein the inner focus lens system is an inner focus lens system, in order from an object side to an image side, comprising a first lens unit, and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include only a first focusing lens unit located closest to the object side, and a second focusing lens unit, as focusing lens units that move along an optical axis in the focusing, at least one of the first focusing lens unit and the second focusing lens unit is composed of two or less lens elements, and the subsequent lens units include an image blur compensating lens unit that moves in a direction perpendicular to the optical axis to optically compensate image blur.

The novel concepts disclosed herein were achieved in order to solve the foregoing problems in the related art, and herein is disclosed:

a camera system comprising:
an interchangeable lens apparatus including an inner focus lens system; and
a camera body which is detachably connected to the interchangeable lens apparatus via a camera mount section, and includes an image sensor for receiving an optical image formed by the inner focus lens system and converting the optical image into an electric image signal, wherein the inner focus lens system is an inner focus lens system, in order from an object side to an image side, comprising a first lens unit, and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include only a first focusing lens unit located closest to the object side, and a second focusing lens unit, as focusing lens units that move along an optical axis in the focusing, at least one of the first focusing lens unit and the second focusing lens unit is composed of two or less lens elements, and the subsequent lens units include an image blur compensating lens unit that moves in a direction perpendicular to the optical axis to optically compensate image blur.

(II) The novel concepts disclosed herein were achieved in order to solve the foregoing problems in the related art, and herein is disclosed:

an inner focus lens system, in order from an object side to an image side, comprising a first lens unit, and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include at least a first focusing lens unit located closest to the object side, and a second focusing lens unit, as focusing lens units that move along an optical axis in the focusing, the subsequent lens units include an image blur compensating lens unit that moves in a direction perpendicular to the optical axis to optically compensate image blur, and the following condition (8) is satisfied:

$$L_A/f_A < 1.2 \ldots \tag{8}$$

where $L_A$ is an overall length of the inner focus lens system (a distance from an object side surface of the first positive lens element to the image surface), and $f_A$ is a focal length of the entire inner focus lens system.

The novel concepts disclosed herein were achieved in order to solve the foregoing problems in the related art, and herein is disclosed:

an interchangeable lens apparatus comprising:

an inner focus lens system; and a lens mount section which is connectable to a camera body including an image sensor for receiving an optical image formed by the inner focus lens system and converting the optical image into an electric image signal, wherein the inner focus lens system is an inner focus lens system, in order from an object side to an image side, comprising a first lens unit, and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include at least a first focusing lens unit located closest to the object side, and a second focusing lens unit, as focusing lens units that move along an optical axis in the focusing, the subsequent lens units include an image blur compensating lens unit that moves in a direction perpendicular to the optical axis to optically compensate image blur, and the following condition (8) is satisfied:

$$L_A/f_A < 1.2 \tag{8}$$

where $L_A$ is an overall length of the inner focus lens system (a distance from an object side surface of the first positive lens element to the image surface), and $f_A$ is a focal length of the entire inner focus lens system.

The novel concepts disclosed herein were achieved in order to solve the foregoing problems in the related art, and herein is disclosed:

a camera system comprising:

an interchangeable lens apparatus including an inner focus lens system; and a camera body which is detachably connected to the interchangeable lens apparatus via a camera mount section, and includes an image sensor for receiving an optical image formed by the inner focus lens system and converting the optical image into an electric image signal, wherein the inner focus lens system is an inner focus lens system, in order from an object side to an image side, comprising a first lens unit, and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include at least a first focusing lens unit located closest to the object side, and a second focusing lens unit, as focusing lens units that move along an optical axis in the focusing, the subsequent lens units include an image blur compensating lens unit that moves in a direction perpendicular to the optical axis to optically compensate image blur, and the following condition (8) is satisfied:

$$L_A/f_A < 1.2 \tag{8}$$

where $L_A$ is an overall length of the inner focus lens system (a distance from an object side surface of the first positive lens element to the image surface), and $f_A$ is a focal length of the entire inner focus lens system.

The inner focus lens system according to the present disclosure is compact, sufficiently suppresses occurrence of various aberrations, and has high resolution and excellent performance.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 5

FIGS. 1, 4, 7, 10, and 13 are lens arrangement diagrams of inner focus lens systems according to Embodiments 1 to 5, respectively.

In each Fig., part (a) shows a lens configuration in an infinity in-focus condition, and part (b) shows a lens configuration in a close-object in-focus condition (object distance: 1 m). In addition, in each Fig., a linear arrow provided between part (a) and part (b) indicates a straight line obtained by connecting the positions of each lens unit in the infinity in-focus condition and the close-object in-focus condition in order from the top. In the part between the infinity in-focus condition and the close-object in-focus condition, the positions are connected simply with a straight line, and therefore, this line does not indicate actual motion of each lens unit.

In each Fig., symbol (+) or (−) imparted to the symbol of each lens unit corresponds to the sign of the optical power of the lens unit. In addition, in each Fig., a straight line located on the most right-hand side indicates the position of an image surface S.

Embodiment 1

Figure 1:
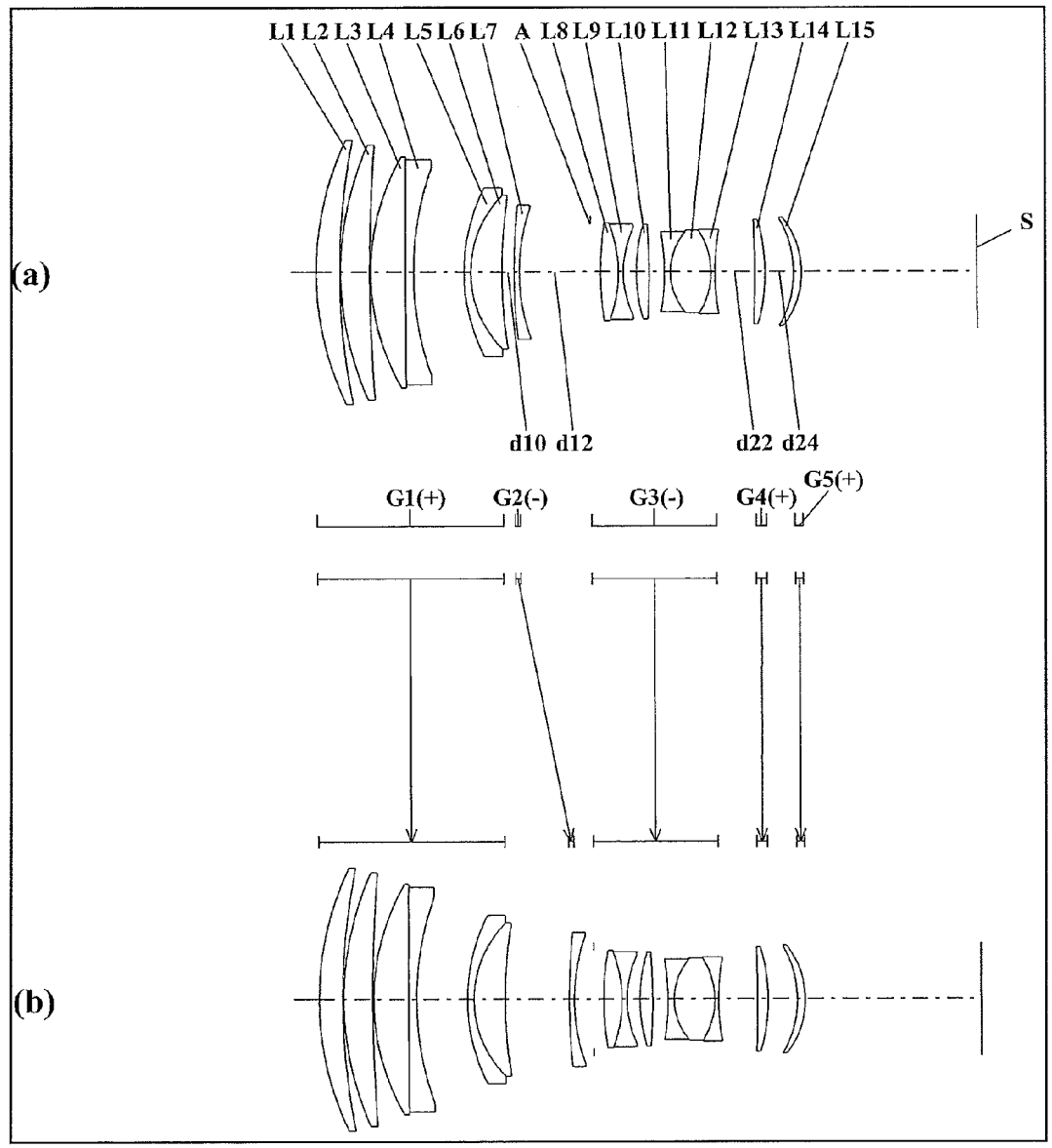
FIG. 1 is a lens arrangement diagram showing an infinity in-focus condition and a close-object in-focus condition of an inner focus lens system according to Embodiment 1 (Numerical Example 1)
Figure 2:
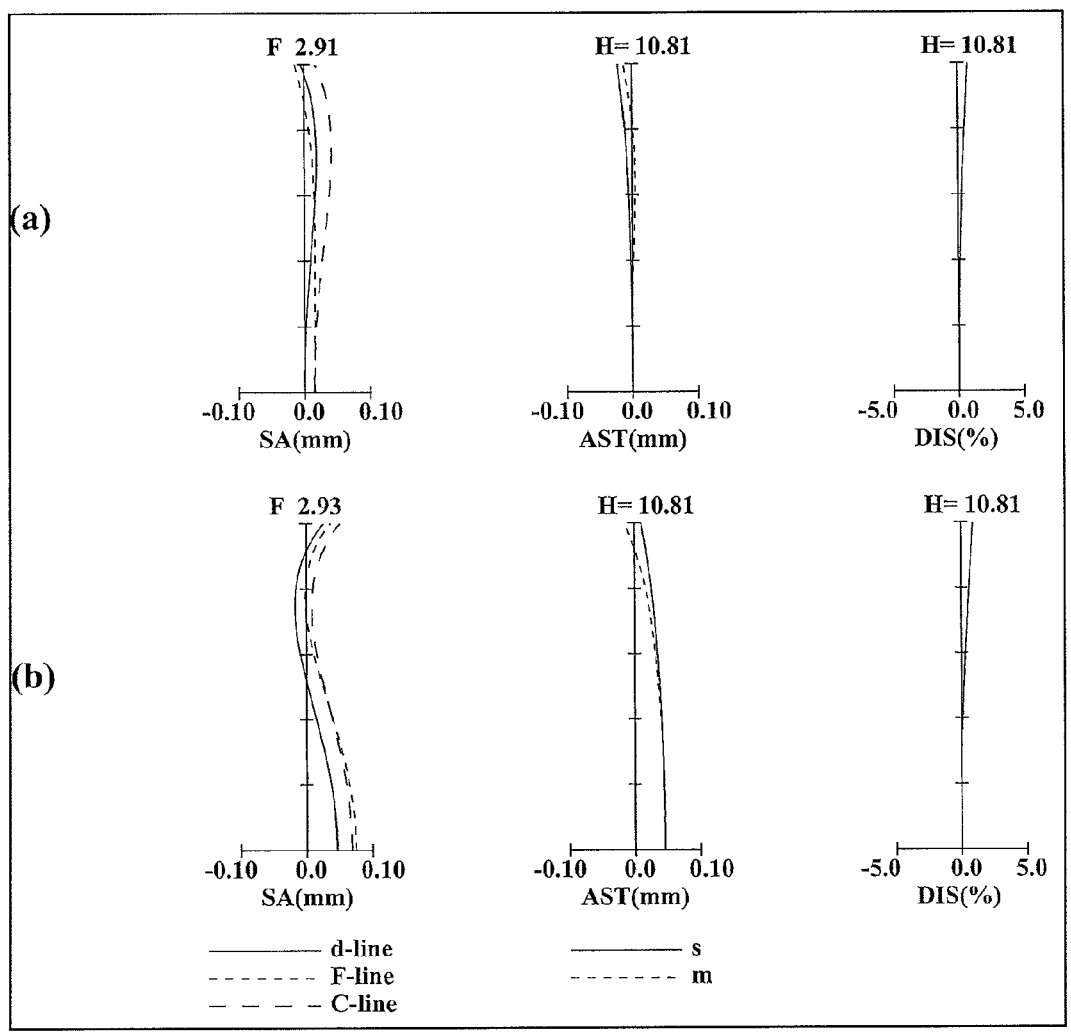
FIG. 2 is a longitudinal aberration diagram of an infinity in-focus condition and a close-object in-focus condition of the inner focus lens system according to Numerical Example 1.
Figure 3:
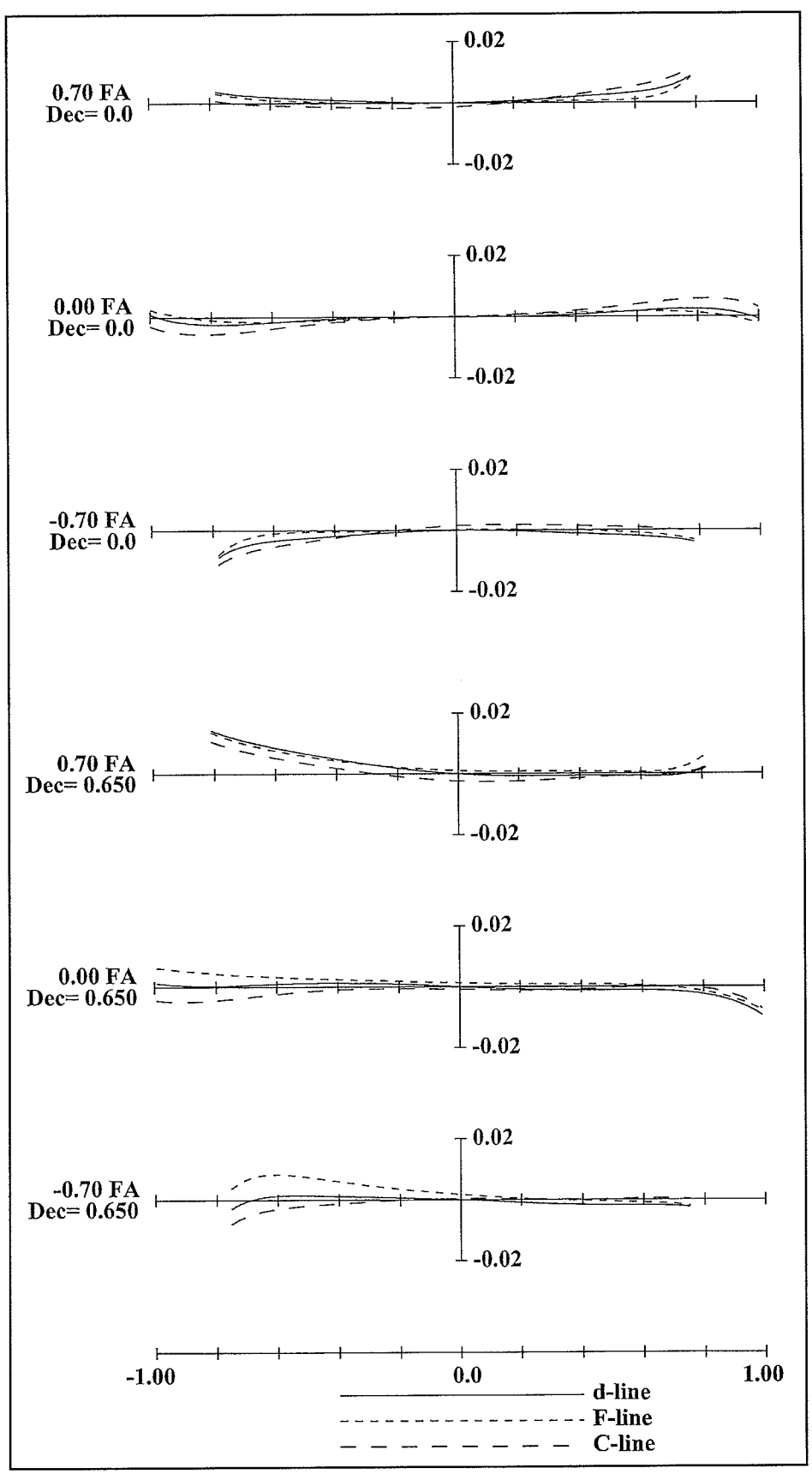
FIG. 3 is a lateral aberration diagram of an infinity in-focus condition of the inner focus lens system according to Numerical Example 1, in a basic state where image blur compensation is not performed and in an image blur compensation state.

As shown in FIG. 1, the first lens unit G1, in order from the object side to the image side, comprises: a positive meniscus first lens element L1 with the convex surface facing the object side; a positive meniscus second lens element L2 with the convex surface facing the object side; a positive meniscus third lens element L3 with the convex surface facing the object side; a negative meniscus fourth lens element L4 with the convex surface facing the object side; a negative meniscus fifth lens element L5 with the convex surface facing the object side; and a positive meniscus sixth lens element L6 with the convex surface facing the object side. Among these, the third lens element L3 and the fourth lens element L4 are cemented with each other, and the fifth lens element L5 and the sixth lens element L6 are cemented with each other.

The second lens unit G2 comprises solely a negative meniscus seventh lens element L7 with the convex surface facing the object side.

The third lens unit G3, in order from the object side to the image side, comprises: a bi-convex eighth lens element L8; a bi-concave ninth lens element L9; a bi-convex tenth lens element L10; a bi-concave eleventh lens element L11; a bi-convex twelfth lens element L12; and a bi-concave thirteenth lens element L13. Among these, the eighth lens element L8 and the ninth lens element L9 are cemented with each other, and the eleventh lens element L11, the twelfth lens element L12, and the thirteenth lens element L13 are cemented with each other.

In the third lens unit G3, an aperture diaphragm A is provided on the object side relative to the eighth lens element L8.

The fourth lens unit G4 comprises solely a positive meniscus fourteenth lens element L14 with the convex surface facing the image side.

The fifth lens unit G5 comprises solely a positive meniscus fifteenth lens element L15 with the convex surface facing the image side.

In the inner focus lens system according to Embodiment 1, in focusing from an infinity in-focus condition to a close-object in-focus condition, the second lens unit G2 moves to the image side along the optical axis, and the fourth lens unit G4 moves to the object side along the optical axis.

Further, the tenth lens element L10 as a part of the third lens unit G3 corresponds to an image blur compensating lens unit described later. By moving the tenth lens element L10 in a direction perpendicular to the optical axis, image point movement caused by vibration of the entire system can be compensated. That is, image blur caused by hand blurring, vibration and the like can be compensated optically.

Embodiment 2

Figure 4:
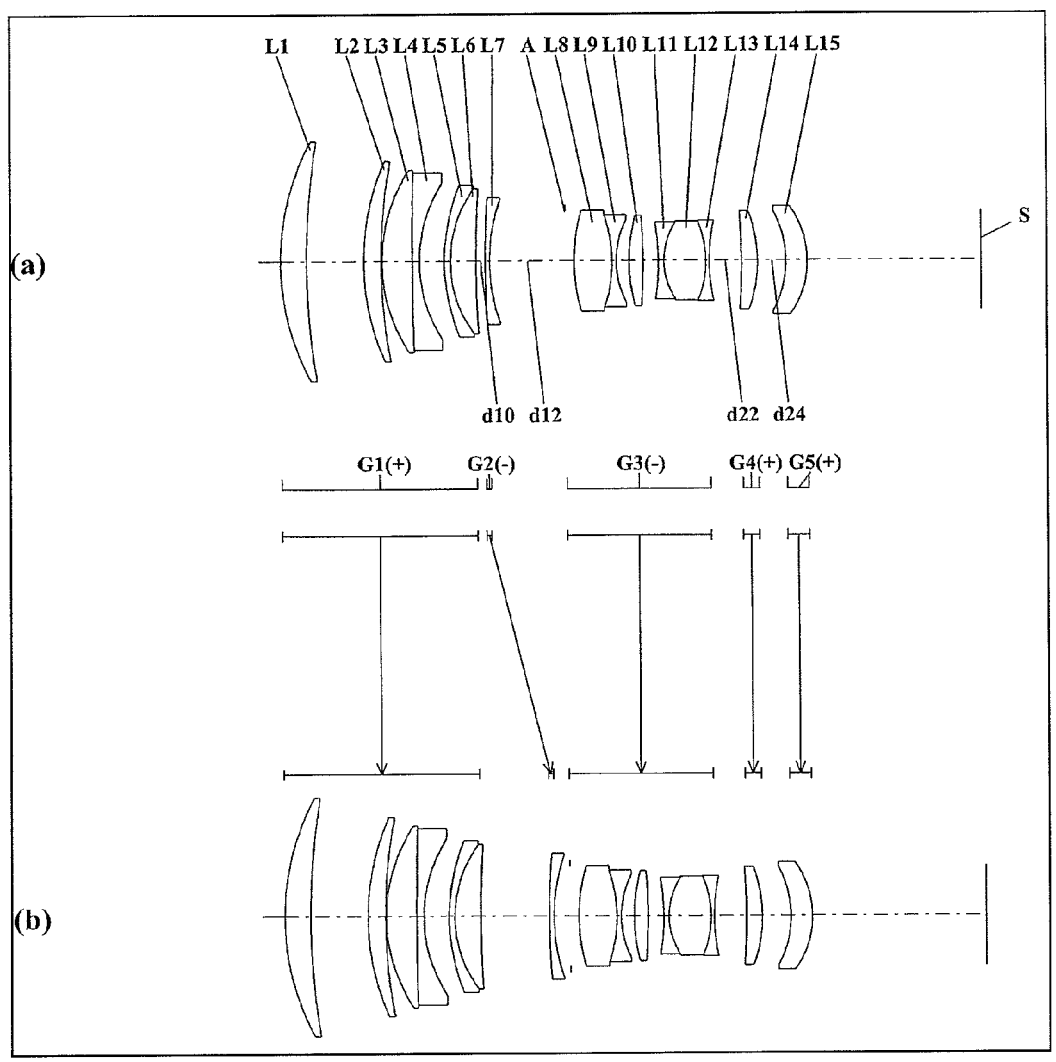
FIG. 4 is a lens arrangement diagram showing an infinity in-focus condition and a close-object in-focus condition of an inner focus lens system according to Embodiment 2 (Numerical Example 2)
Figure 5:
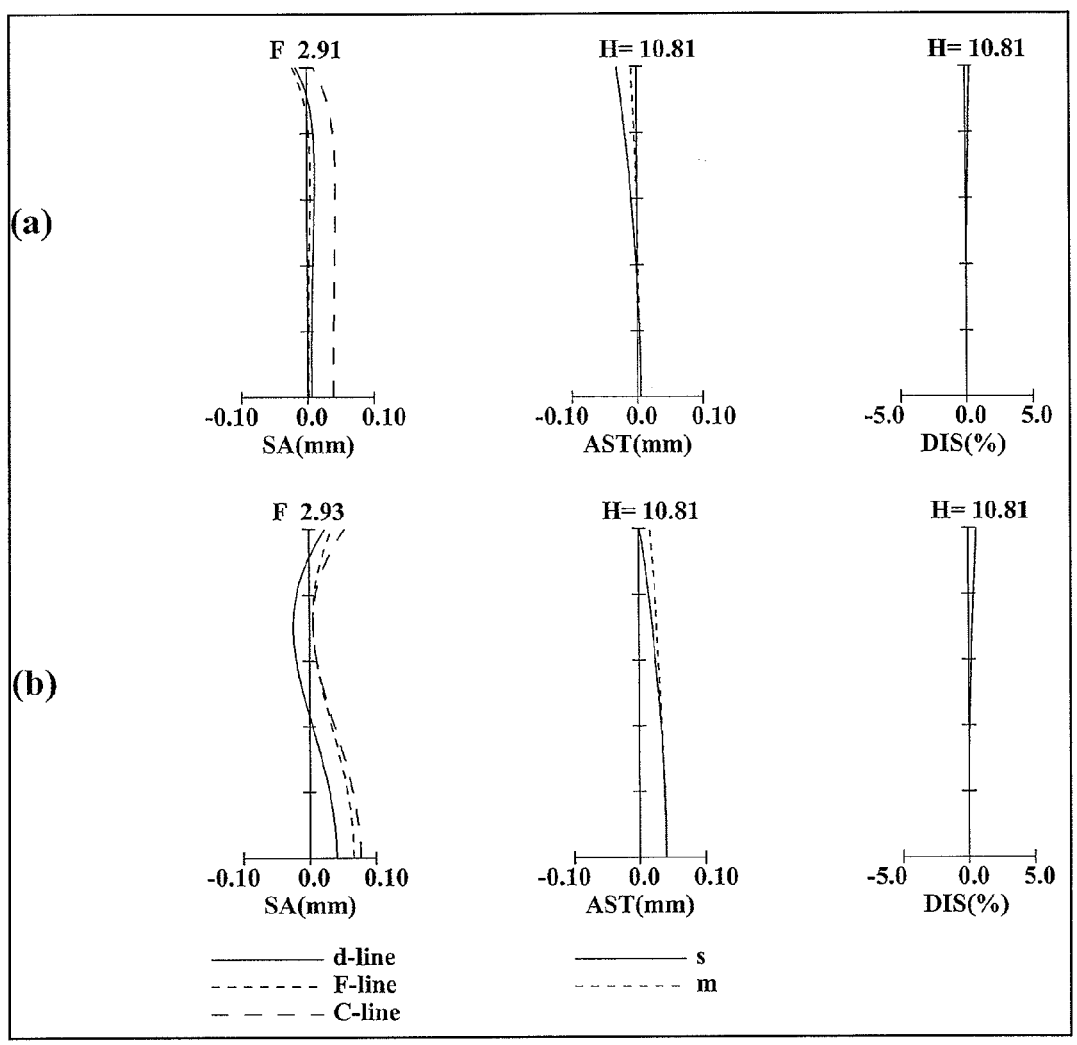
FIG. 5 is a longitudinal aberration diagram of an infinity in-focus condition and a close-object in-focus condition of the inner focus lens system according to Numerical Example 2.
Figure 6:
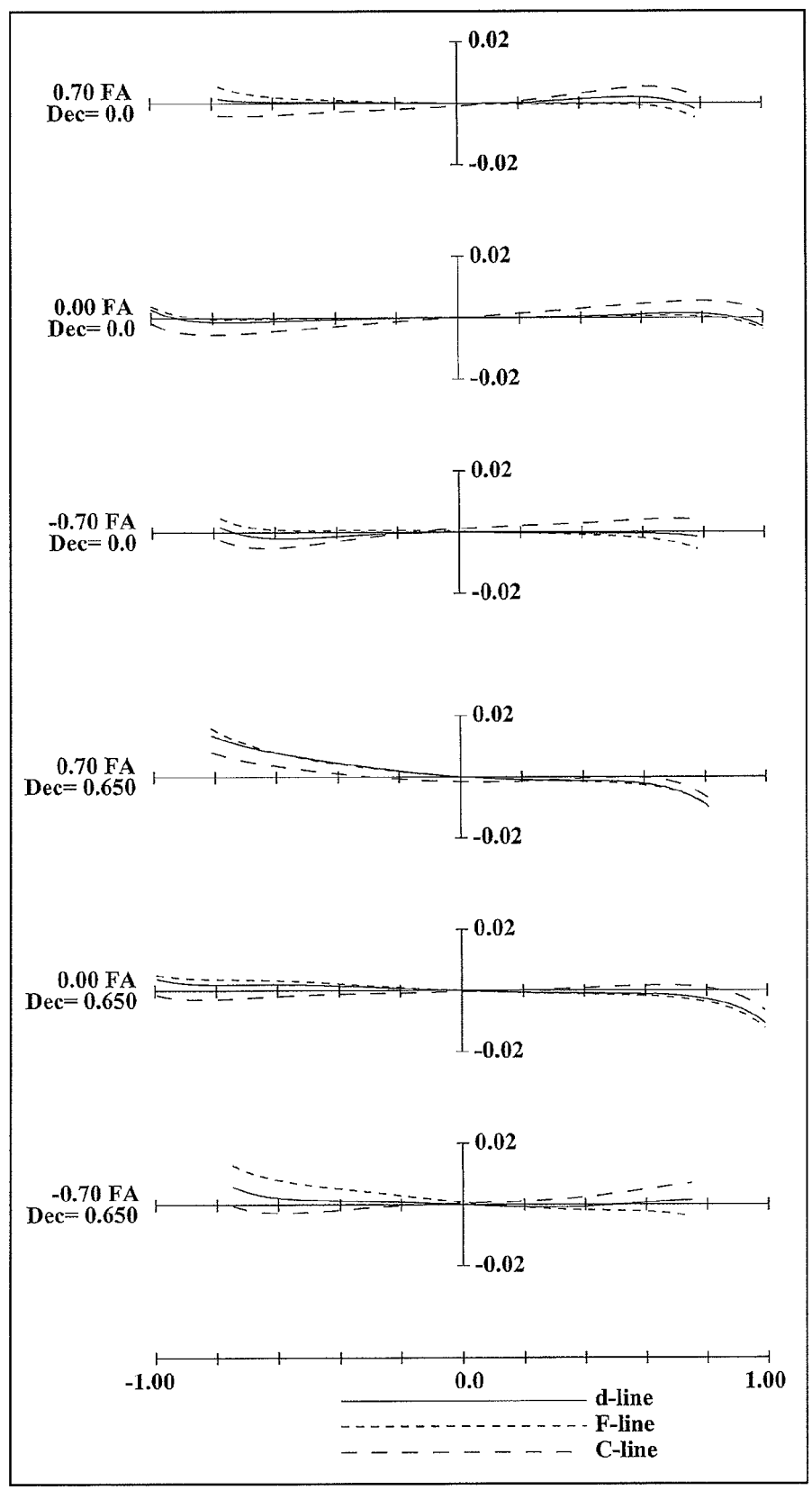
FIG. 6 is a lateral aberration diagram of an infinity in-focus condition of the inner focus lens system according to Numerical Example 2, in a basic state where image blur compensation is not performed and in an image blur compensation state.

As shown in FIG. 4, the first lens unit G1, in order from the object side to the image side, comprises: a positive meniscus first lens element L1 with the convex surface facing the object side; a positive meniscus second lens element L2 with the convex surface facing the object side; a positive meniscus third lens element L3 with the convex surface facing the object side; a negative meniscus fourth lens element L4 with the convex surface facing the object side; a negative meniscus fifth lens element L5 with the convex surface facing the object side; and a positive meniscus sixth lens element L6 with the convex surface facing the object side. Among these, the third lens element L3 and the fourth lens element L4 are cemented with each other, and the fifth lens element L5 and the sixth lens element L6 are cemented with each other.

The second lens unit G2 comprises solely a negative meniscus seventh lens element L7 with the convex surface facing the object side.

The third lens unit G3, in order from the object side to the image side, comprises: a bi-convex eighth lens element L8; a bi-concave ninth lens element L9; a bi-convex tenth lens element L10; a bi-concave eleventh lens element L11; a bi-convex twelfth lens element L12; and a bi-concave thirteenth lens element L13. Among these, the eighth lens element L8 and the ninth lens element L9 are cemented with each other, and the eleventh lens element L11, the twelfth lens element L12, and the thirteenth lens element L13 are cemented with each other.

In the third lens unit G3, an aperture diaphragm A is provided on the object side relative to the eighth lens element L8.

The fourth lens unit G4 comprises solely a positive meniscus fourteenth lens element L14 with the convex surface facing the image side.

The fifth lens unit G5 comprises solely a positive meniscus fifteenth lens element L15 with the convex surface facing the image side.

In the inner focus lens system according to Embodiment 2, in focusing from an infinity in-focus condition to a close-object in-focus condition, the second lens unit G2 moves to the image side along the optical axis, and the fourth lens unit G4 moves to the object side along the optical axis.

Further, the tenth lens element L10 as a part of the third lens unit G3 corresponds to an image blur compensating lens unit described later. By moving the tenth lens element L10 in a direction perpendicular to the optical axis, image point movement caused by vibration of the entire system can be compensated. That is, image blur caused by hand blurring, vibration and the like can be compensated optically.

Embodiment 3

Figure 7:
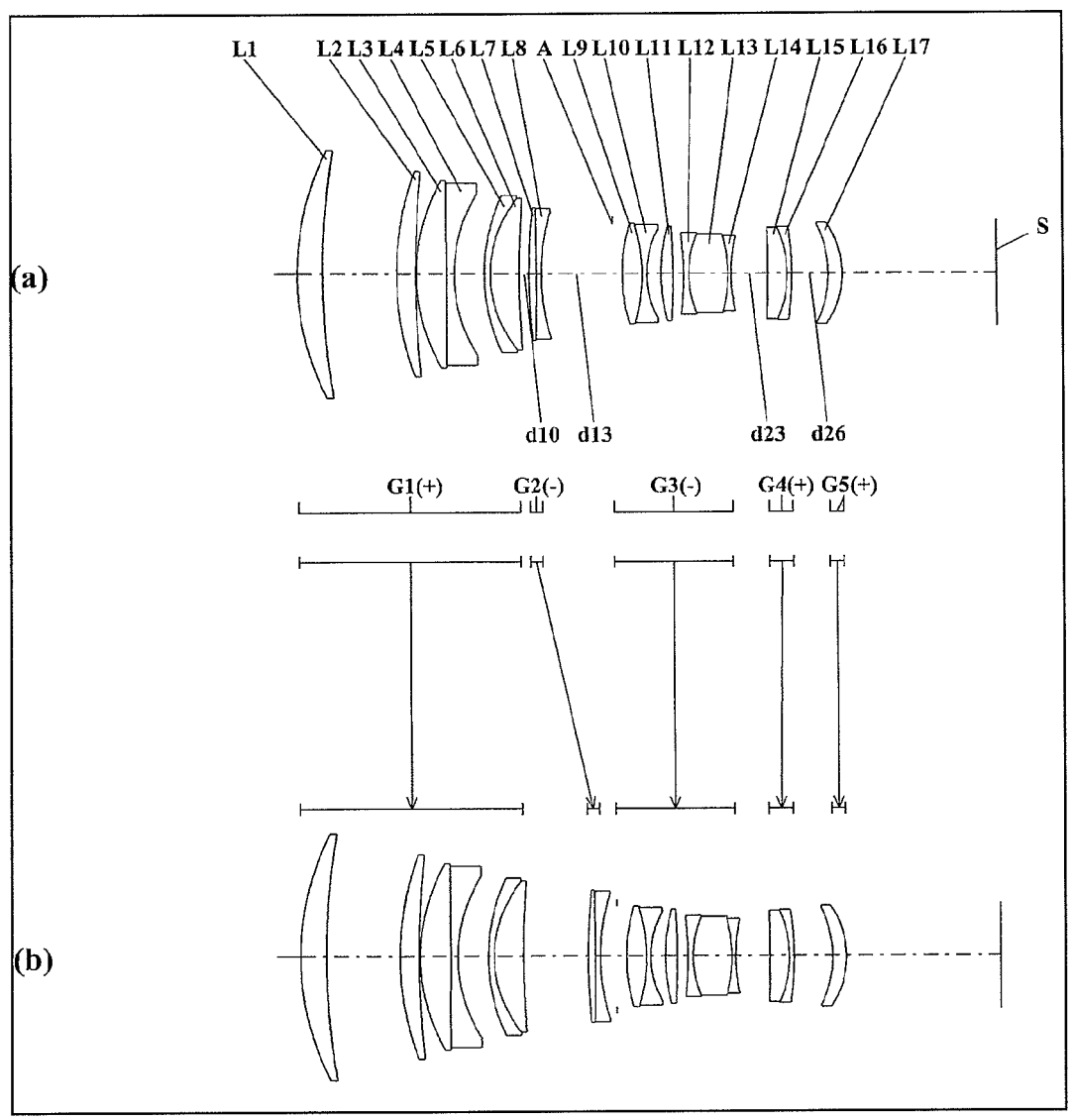
FIG. 7 is a lens arrangement diagram showing an infinity in-focus condition and a close-object in-focus condition of an inner focus lens system according to Embodiment 3 (Numerical Example 3)
Figure 8:
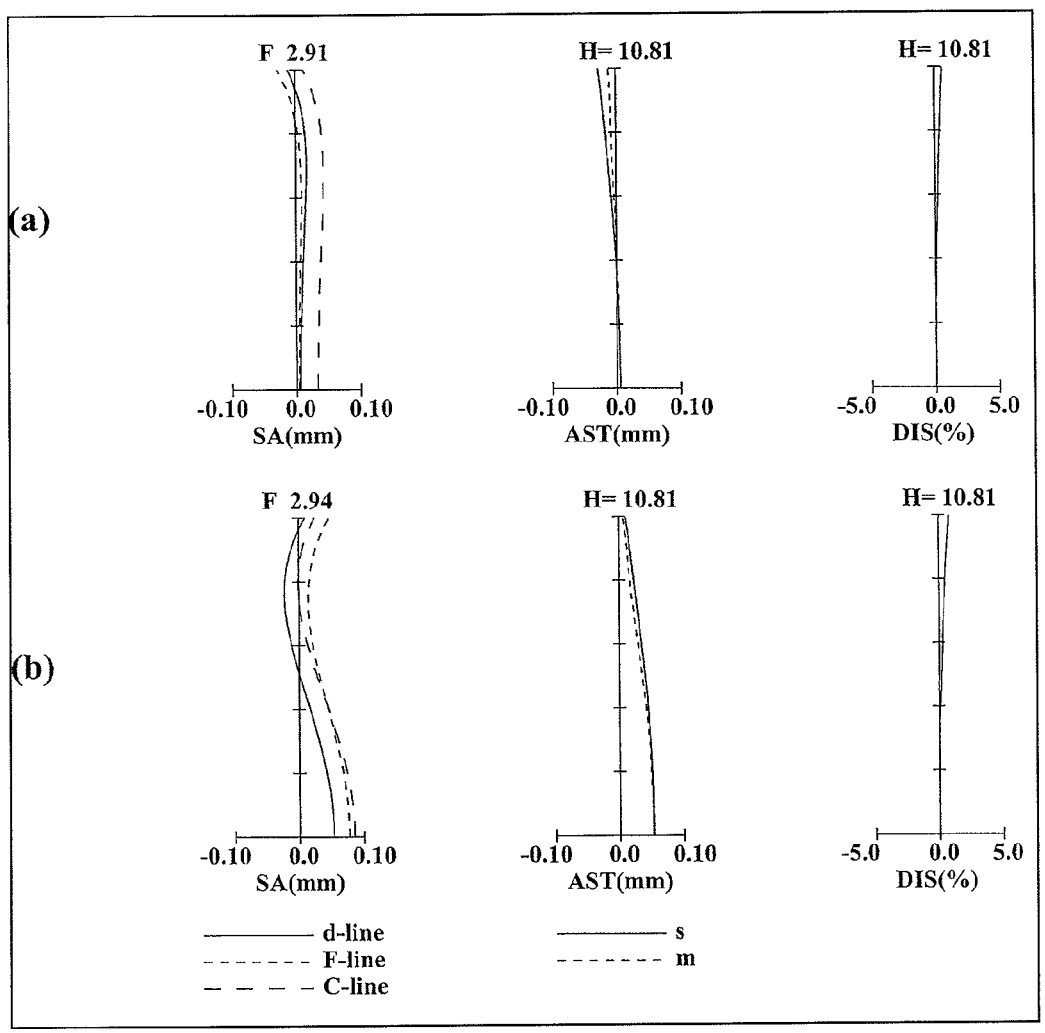
FIG. 8 is a longitudinal aberration diagram of an infinity in-focus condition and a close-object in-focus condition of the inner focus lens system according to Numerical Example 3.
Figure 9:
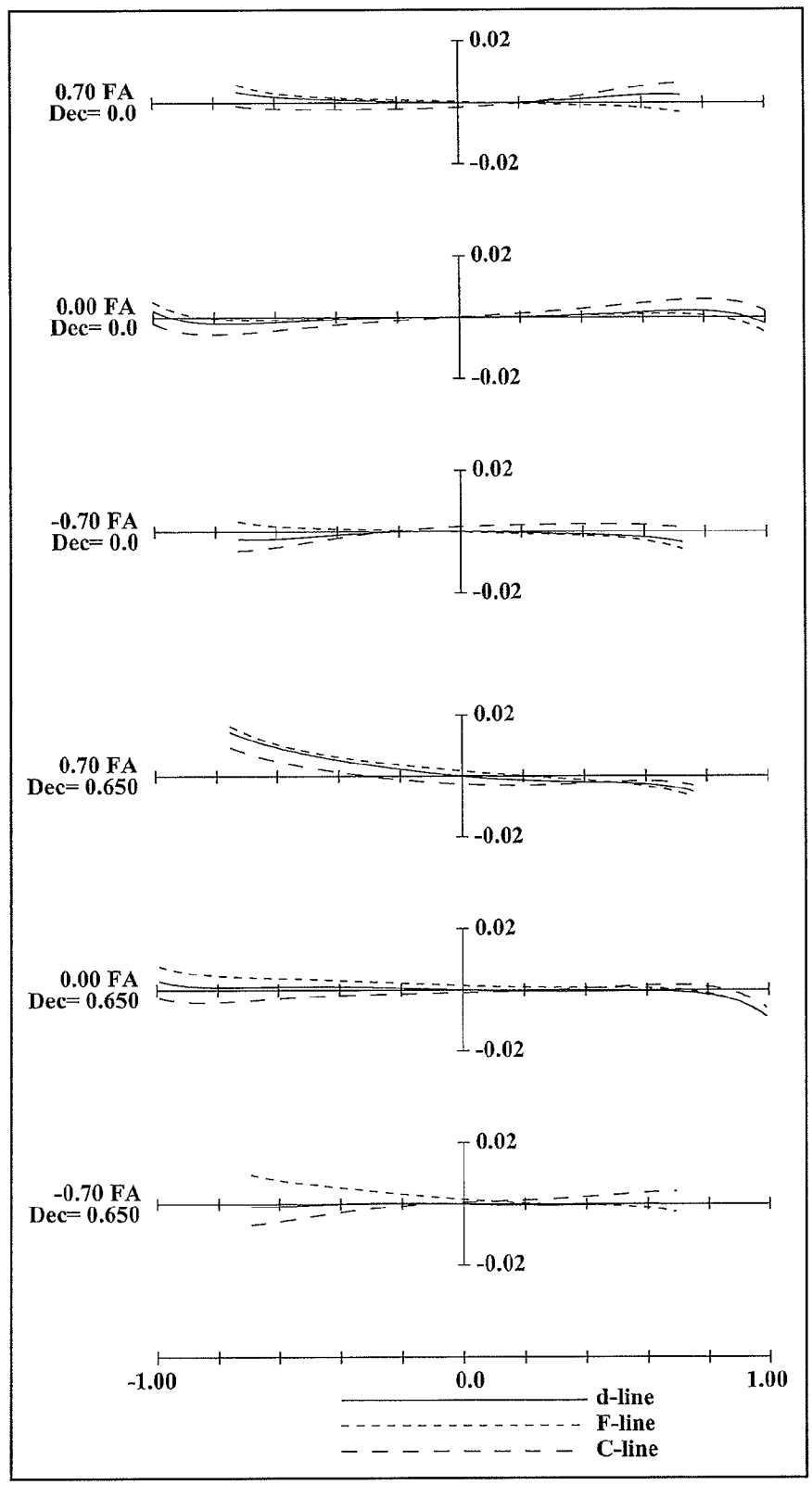
FIG. 9 is a lateral aberration diagram of an infinity in-focus condition of the inner focus lens system according to Numerical Example 3, in a basic state where image blur compensation is not performed and in an image blur compensation state.

As shown in FIG. 7, the first lens unit G1, in order from the object side to the image side, comprises: a positive meniscus first lens element L1 with the convex surface facing the object side; a positive meniscus second lens element L2 with the convex surface facing the object side; a bi-convex third lens element L3; a bi-concave fourth lens element L4; a negative meniscus fifth lens element L5 with the convex surface facing the object side; and a positive meniscus sixth lens element L6 with the convex surface facing the object side. Among these, the third lens element L3 and the fourth lens element L4 are cemented with each other, and the fifth lens element L5 and the sixth lens element L6 are cemented with each other.

The second lens unit G2, in order from the object side to the image side, comprises: a bi-convex seventh lens element L7; and a bi-concave eighth lens element L8. The seventh lens element L7 and the eighth lens element L8 are cemented with each other.

The third lens unit G3, in order from the object side to the image side, comprises: a bi-convex ninth lens element L9; a bi-concave tenth lens element L10; a bi-convex eleventh lens element L11; a bi-concave twelfth lens element L12; a bi-convex thirteenth lens element L13; and a bi-concave fourteenth lens element L14. Among these, the ninth lens element L9 and the tenth lens element L10 are cemented with each other, and the twelfth lens element L12, the thirteenth lens element L13, and the fourteenth lens element L14 are cemented with each other.

In the third lens unit G3, an aperture diaphragm A is provided on the object side relative to the ninth lens element L9.

The fourth lens unit G4, in order from the object side to the image side, comprises: a positive meniscus fifteenth lens element L15 with the convex surface facing the image side; and a negative meniscus sixteenth lens element L16 with the convex surface facing the image side. The fifteenth lens element L15 and the sixteenth lens element L16 are cemented with each other.

The fifth lens unit G5 comprises solely a positive meniscus seventeenth lens element L17 with the convex surface facing the image side.

In the inner focus lens system according to Embodiment 3, in focusing from an infinity in-focus condition to a close-object in-focus condition, the second lens unit G2 moves to the image side along the optical axis, and the fourth lens unit G4 moves to the object side along the optical axis.

Further, the eleventh lens element L11 as a part of the third lens unit G3 corresponds to an image blur compensating lens unit described later. By moving the eleventh lens element L11 in a direction perpendicular to the optical axis, image point movement caused by vibration of the entire system can be compensated. That is, image blur caused by hand blurring, vibration and the like can be compensated optically.

Embodiment 4

Figure 10:
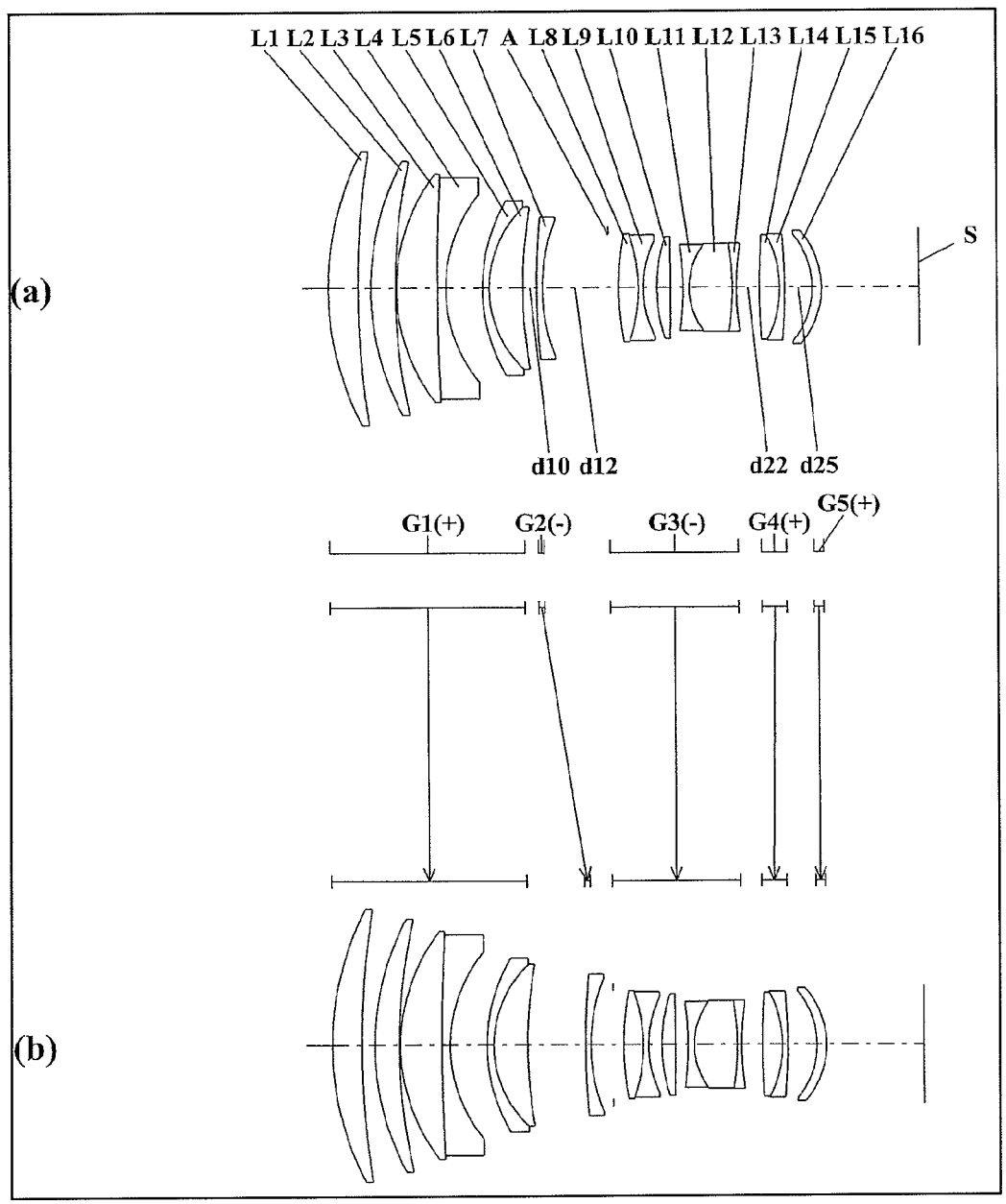
FIG. 10 is a lens arrangement diagram showing an infinity in-focus condition and a close-object in-focus condition of an inner focus lens system according to Embodiment 4 (Numerical Example 4)
Figure 11:
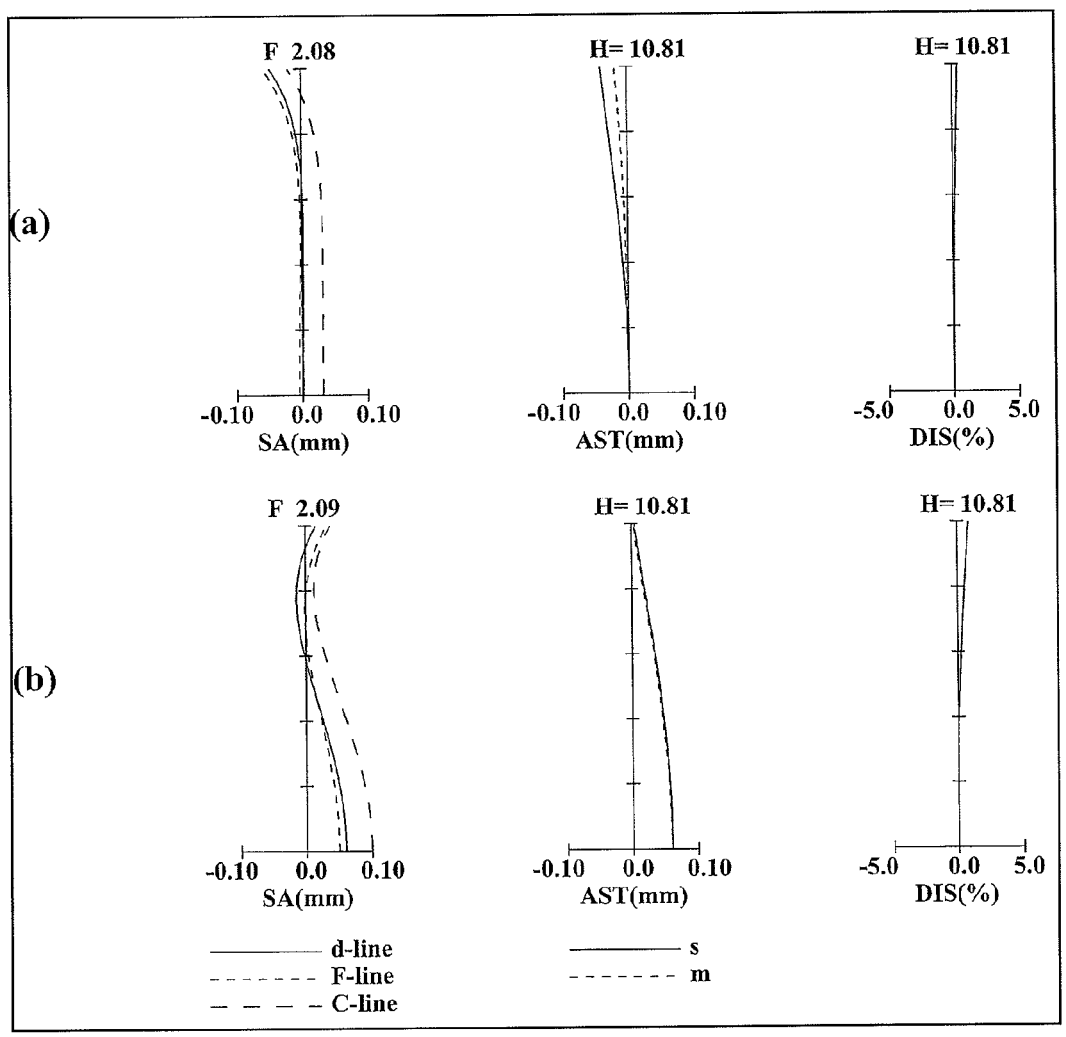
FIG. 11 is a longitudinal aberration diagram of an infinity in-focus condition and a close-object in-focus condition of the inner focus lens system according to Numerical Example 4.
Figure 12:
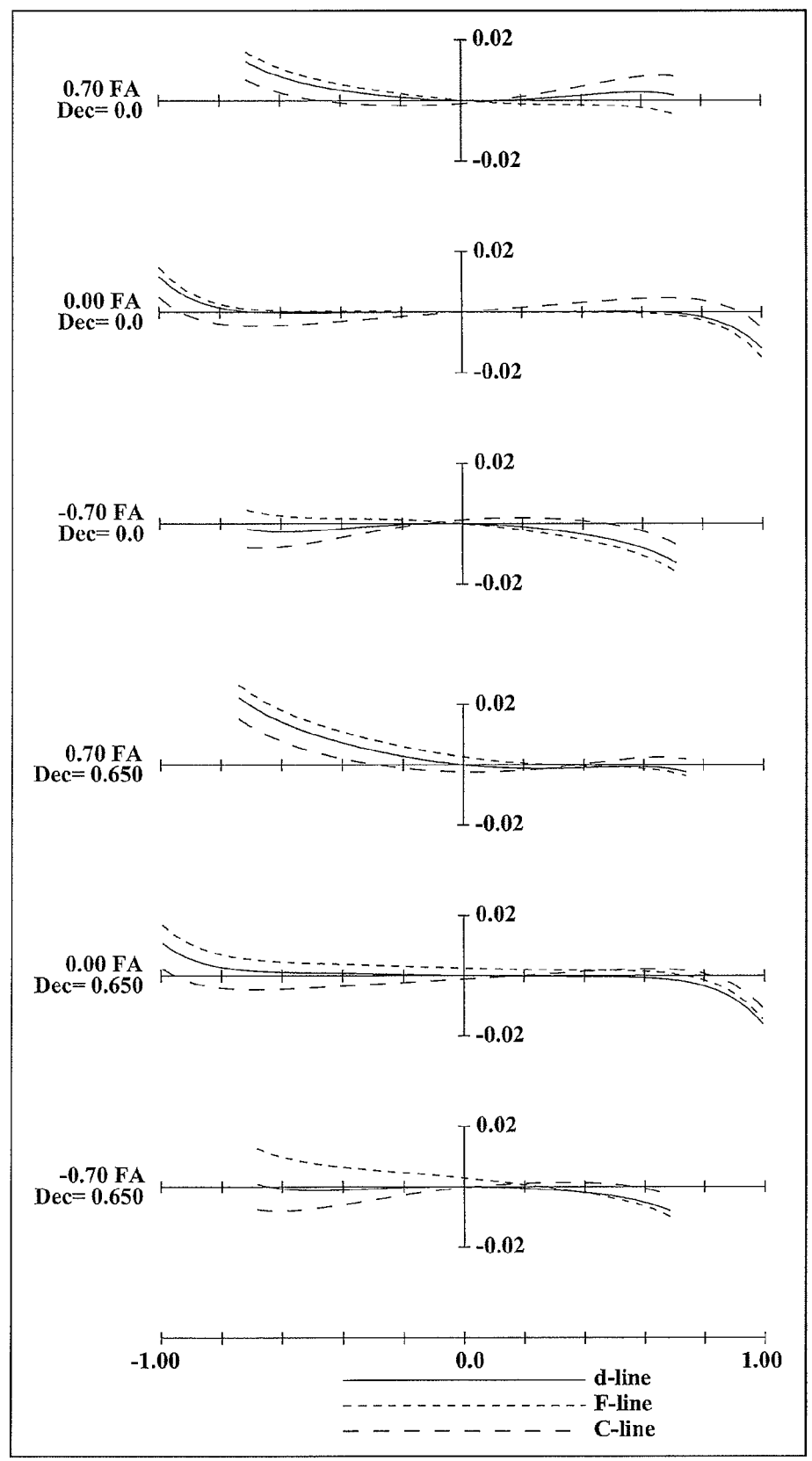
FIG. 12 is a lateral aberration diagram of an infinity in-focus condition of the inner focus lens system according to Numerical Example 4, in a basic state where image blur compensation is not performed and in an image blur compensation state.

As shown in FIG. 10, the first lens unit G1, in order from the object side to the image side, comprises: a positive meniscus first lens element L1 with the convex surface facing the object side; a positive meniscus second lens element L2 with the convex surface facing the object side; a positive meniscus third lens element L3 with the convex surface facing the object side; a negative meniscus fourth lens element L4 with the convex surface facing the object side; a negative meniscus fifth lens element L5 with the convex surface facing the object side; and a positive meniscus sixth lens element L6 with the convex surface facing the object side. Among these, the third lens element L3 and the fourth lens element L4 are cemented with each other, and the fifth lens element L5 and the sixth lens element L6 are cemented with each other.

The second lens unit G2 comprises solely a negative meniscus seventh lens element L7 with the convex surface facing the object side.

The third lens unit G3, in order from the object side to the image side, comprises: a bi-convex eighth lens element L8; a bi-concave ninth lens element L9; a bi-convex tenth lens element L10; a bi-concave eleventh lens element L11; a bi-convex twelfth lens element L12; and a bi-concave thirteenth lens element L13. Among these, the eighth lens element L8 and the ninth lens element L9 are cemented with each other, and the eleventh lens element L11, the twelfth lens element L12, and the thirteenth lens element L13 are cemented with each other.

In the third lens unit G3, an aperture diaphragm A is provided on the object side relative to the eighth lens element L8.

The fourth lens unit G4, in order from the object side to the image side, comprises: a bi-convex fourteenth lens element L14; and a negative meniscus fifteenth lens element L15 with the convex surface facing the image side. The fourteenth lens element L14 and the fifteenth lens element L15 are cemented with each other.

The fifth lens unit G5 comprises solely a negative meniscus sixteenth lens element L16 with the convex surface facing the image side.

In the inner focus lens system according to Embodiment 4, in focusing from an infinity in-focus condition to a close-object in-focus condition, the second lens unit G2 moves to the image side along the optical axis, and the fourth lens unit G4 moves to the object side along the optical axis.

Further, the tenth lens element L10 as a part of the third lens unit G3 corresponds to an image blur compensating lens unit described later. By moving the tenth lens element L10 in a direction perpendicular to the optical axis, image point movement caused by vibration of the entire system can be compensated. That is, image blur caused by hand blurring, vibration and the like can be compensated optically.

Embodiment 5

Figure 13:
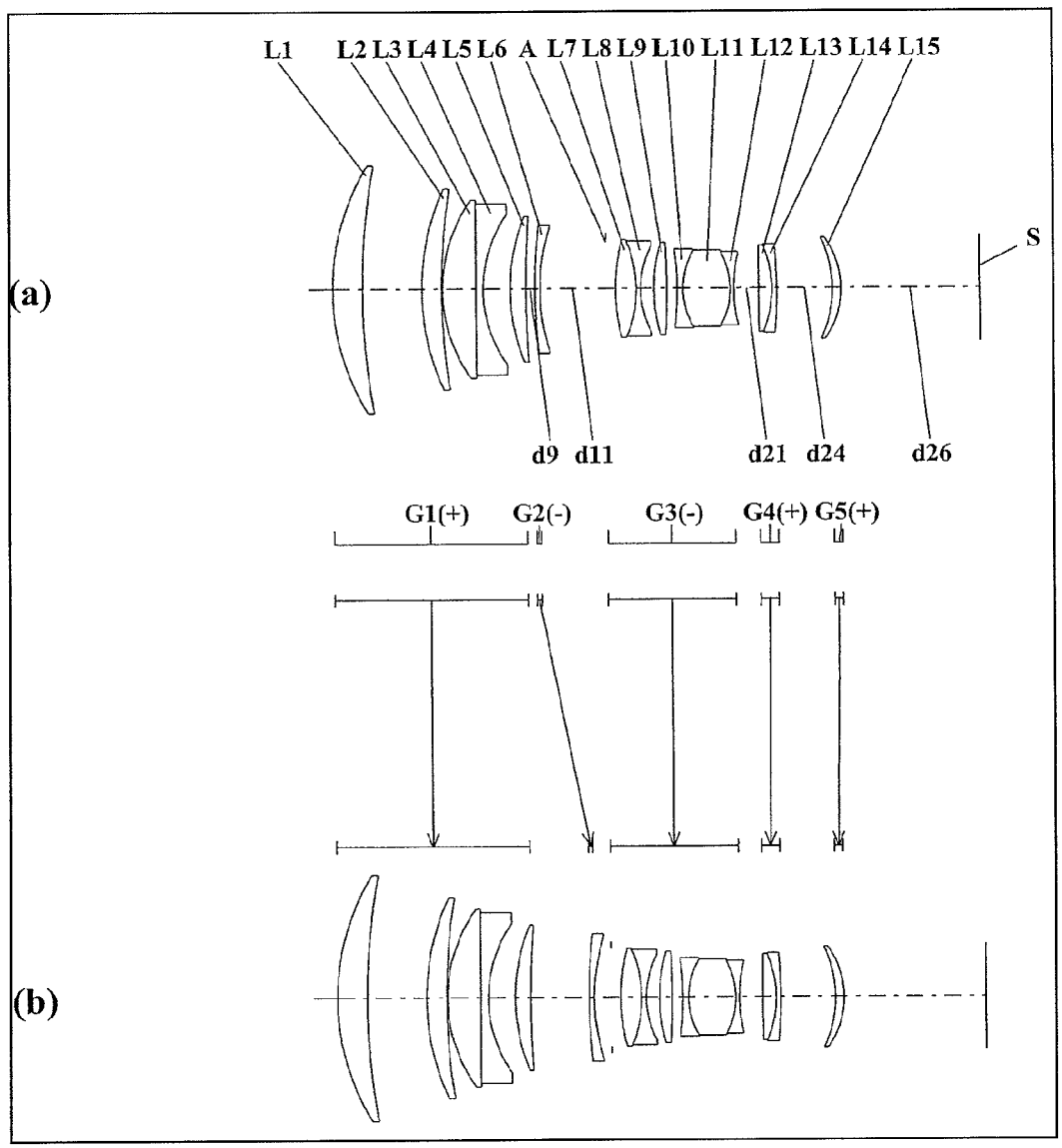
FIG. 13 is a lens arrangement diagram showing an infinity in-focus condition and a close-object in-focus condition of an inner focus lens system according to Embodiment 5 (Numerical Example 5)
Figure 14:
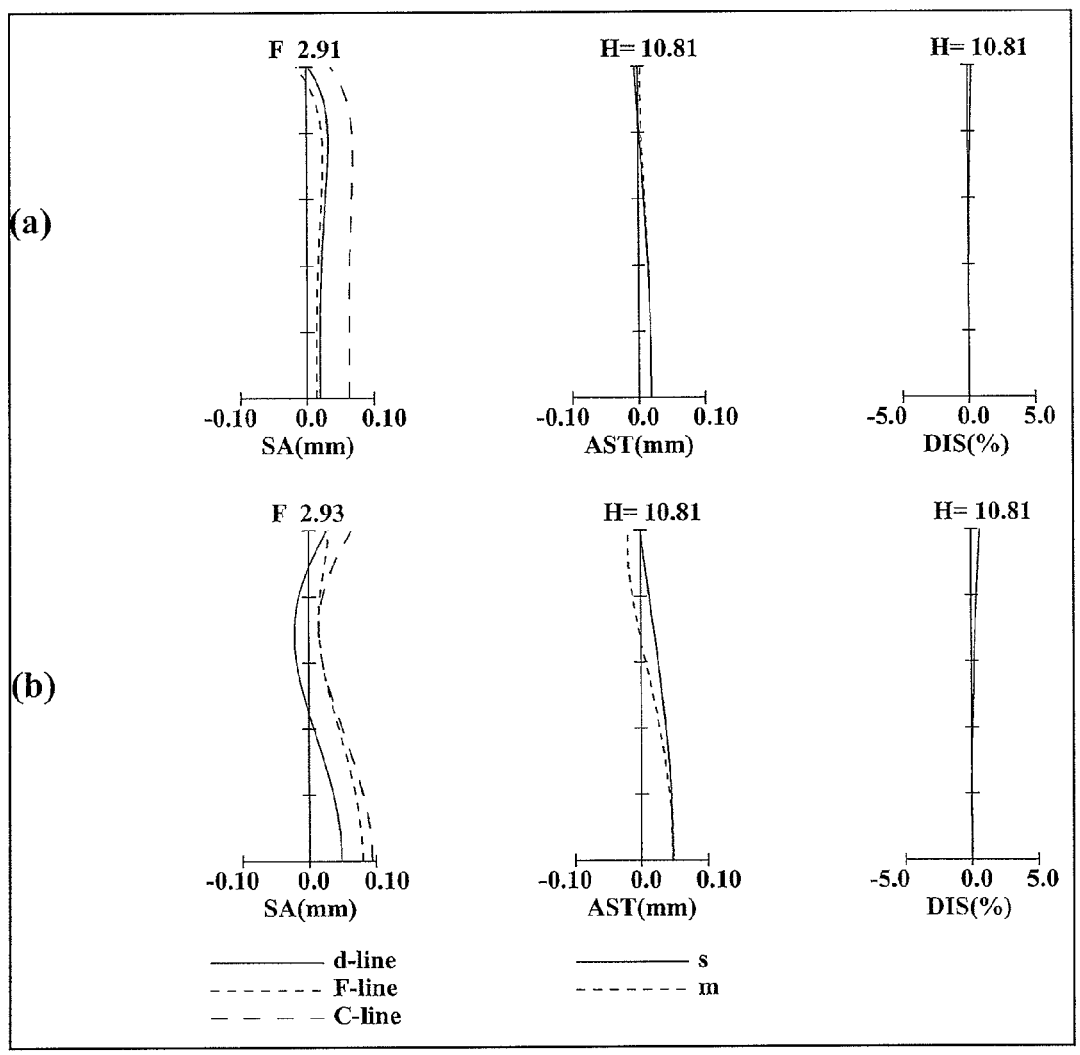
FIG. 14 is a longitudinal aberration diagram of an infinity in-focus condition and a close-object in-focus condition of the inner focus lens system according to Numerical Example 5.
Figure 15:
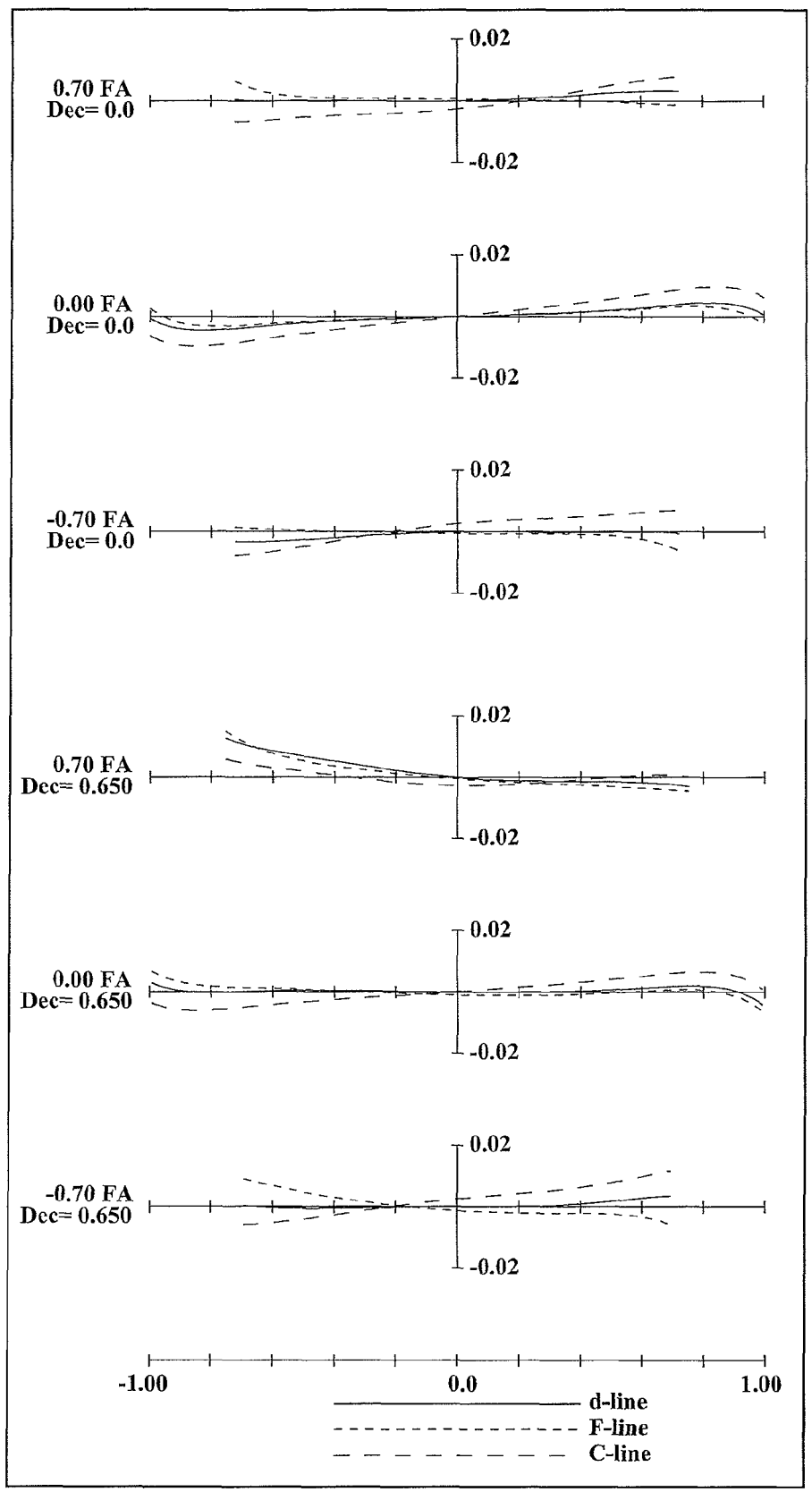
FIG. 15 is a lateral aberration diagram of an infinity in-focus condition of the inner focus lens system according to Numerical Example 5, in a basic state where image blur compensation is not performed and in an image blur compensation state.

As shown in FIG. 13, the first lens unit G1, in order from the object side to the image side, comprises: a positive meniscus first lens element L1 with the convex surface facing the object side; a positive meniscus second lens element L2 with the convex surface facing the object side; a positive meniscus third lens element L3 with the convex surface facing the object side; a negative meniscus fourth lens element L4 with the convex surface facing the object side; and a positive meniscus fifth lens element L5 with the convex surface facing the object side. Among these, the third lens element L3 and the fourth lens element L4 are cemented with each other.

The second lens unit G2 comprises solely a negative meniscus sixth lens element L6 with the convex surface facing the object side.

The third lens unit G3, in order from the object side to the image side, comprises: a bi-convex seventh lens element L7; a bi-concave eighth lens element L8; a bi-convex ninth lens element L9; a bi-concave tenth lens element L10; a bi-convex eleventh lens element L11; and a bi-concave twelfth lens element L12. Among these, the seventh lens element L7 and the eighth lens element L8 are cemented with each other, and the tenth lens element L10, the eleventh lens element L11, and the twelfth lens element L12 are cemented with each other.

In the third lens unit G3, an aperture diaphragm A is provided on the object side relative to the seventh lens element L7.

The fourth lens unit G4, in order from the object side to the image side, comprises: a bi-convex thirteenth lens element L13; and a negative meniscus fourteenth lens element L14 with the convex surface facing the image side. The thirteenth lens element L13 and the fourteenth lens element L14 are cemented with each other.

The fifth lens unit G5 comprises solely a positive meniscus fifteenth lens element L15 with the convex surface facing the image side.

In the inner focus lens system according to Embodiment 5, in focusing from an infinity in-focus condition to a close-object in-focus condition, the second lens unit G2 moves to the image side along the optical axis, the fourth lens unit G4 moves to the object side along the optical axis, and the fifth lens unit G5 moves to the object side along the optical axis.

Further, the ninth lens element L9 as a part of the third lens unit G3 corresponds to an image blur compensating lens unit described later. By moving the ninth lens element L9 in a direction perpendicular to the optical axis, image point movement caused by vibration of the entire system can be compensated. That is, image blur caused by hand blurring, vibration and the like can be compensated optically.

In the inner focus lens systems according to Embodiments 1 to 5, the first lens unit G1 is fixed with respect to the image surface in focusing from an infinity in-focus condition to a close-object in-focus condition. Therefore, variation in spherical aberration associated with focusing is small, and thus focusing can be performed with excellent imaging characteristics being maintained.

In the inner focus lens systems according to Embodiments 1 to 5, the first lens unit G1 includes: the first positive lens element being located closest to the object side, and having positive optical power; and the second positive lens element having positive optical power. Therefore, it is possible to provide an inner focus lens system in which axial chromatic aberration is small.

In the inner focus lens systems according to Embodiments 1 to 5, the subsequent lens units are provided on the image side relative to the first lens unit G1, and the subsequent lens units include the first focusing lens unit located closest to the object side, and the second focusing lens unit, as focusing lens units that move along the optical axis in focusing from an infinity in-focus condition to a close-object in-focus condition. Therefore, variation in spherical aberration associated with focusing is small, and thus focusing can be performed with excellent imaging characteristics being maintained.

In the inner focus lens systems according to Embodiments 1 to 5, at least one of the first focusing lens unit and the second focusing lens unit is composed of two or less lens elements. Therefore, high-speed and silent focusing can be performed.

In the inner focus lens systems according to Embodiments 1 to 5, the subsequent lens units include an image blur compensating lens unit that moves in a direction perpendicular to the optical axis to optically compensate image blur. Therefore, deterioration in the image due to hand blurring can be reduced.

In the disclosure, the image blur compensating lens unit may be one lens unit, or may be any one of a plurality of lens elements or at least two lens elements that are adjacent with each other among the plurality of lens elements when a lens unit is constituted of the plurality of lens elements.

As described above, Embodiments 1 to 5 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that an inner focus lens system like the inner focus lens systems according to Embodiments 1 to 5 can satisfy. Here, a plurality of conditions are set forth for the inner focus lens system according to each embodiment. A construction that satisfies all the plural conditions is most effective for the inner focus lens system. However, when an individual condition is satisfied, an inner focus lens system having the corresponding effect is obtained.

For example,
in an inner focus lens system like the inner focus lens systems according to Embodiments 1 to 5, which comprises, in order from an object side to an image side, a first lens unit and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include only a first focusing lens unit located closest to the object side, and a second focusing lens unit, as focusing lens units that move along an optical axis in the focusing, at least one of the first focusing lens unit and the second focusing lens unit is composed of two or less lens elements, and the subsequent lens units include an image blur compensating lens unit that moves in a direction perpendicular to the optical axis to optically compensate image blur (this lens configuration is referred to as a basic configuration I of the embodiment, hereinafter), and in an inner focus lens system like the inner focus lens systems according to Embodiments 1 to 5, which comprises, in order from an object side to an image side, a first lens unit and subsequent lens units, wherein the first lens unit is fixed with respect to an image surface in focusing from an infinity in-focus condition to a close-object in-focus condition, the first lens unit includes: a first positive lens element being located closest to the object side, and having positive optical power; and a second positive lens element having positive optical power, the subsequent lens units include at least a first focusing lens unit located closest to the object side, and a second focusing lens unit, as focusing lens units that move along an optical axis in the focusing, and the subsequent lens units include an image blur compensating lens unit that moves in a direction perpendicular to the optical axis to optically compensate image blur (this lens configuration is referred to as a basic configuration II of the embodiment, hereinafter), it is beneficial that the following condition (1) is satisfied.

$$vd_{L1} < 35 \quad (1)$$

where $vd_{L1}$ is the Abbe number to the d-line of the first positive lens element.

The condition (1) sets forth the Abbe number of the first positive lens element. When the value exceeds the upper limit of the condition (1), chromatic aberration that occurs in the first lens unit becomes excessively large, which makes it difficult to suppress occurrence of axial chromatic aberration.

When the following condition (1)' is satisfied, the above-mentioned effect is achieved more successfully.

$$vd_{L1} < 25 \quad (1)'$$

It is beneficial that an inner focus lens system having the basic configuration I and an inner focus lens system having the basic configuration II, like the inner focus lens systems according to Embodiments 1 to 5, satisfy the following condition (2):

$$nd_{L1} > 1.8 \quad (2)$$

where $nd_{L1}$ is the refractive index to the d-line of the first positive lens element.

The condition (2) sets forth the refractive index of the first positive lens element. When the value goes below the lower limit of the condition (2), it becomes difficult to suppress occurrence of spherical aberration.

When the following condition (2)' is satisfied, the above-mentioned effect is achieved more successfully.

$$nd_{L1} > 1.86 \quad (2)'$$

It is beneficial that an inner focus lens system having the basic configuration I and an inner focus lens system having the basic configuration II, like the inner focus lens systems according to Embodiments 1 to 5, satisfy the following condition (3):

$$1 < |f_{F1}/f_{F2}| < 3 \quad (3)$$

where $f_{F1}$ is the focal length of the first focusing lens unit, and
$f_{F2}$ is the focal length of the second focusing lens unit.

The condition (3) sets forth the ratio of the focal length of the first focusing lens unit to the focal length of the second focusing lens unit. When the value goes below the lower limit of the condition (3), the optical power of the first focusing lens unit becomes excessively strong, which makes it difficult to suppress variation in astigmatism associated with focusing. When the value exceeds the upper limit of the condition (3), the optical power of the second focusing lens unit becomes excessively strong, which makes it difficult to suppress variation in axial chromatic aberration associated with focusing.

When at least one of the following conditions (3)' and (3)'' is satisfied, the above-mentioned effect is achieved more successfully.

$$1.5 < |f_{F1}/f_{F2}| \quad (3)'$$

$$|f_{F1}/f_{F2}| < 2.2 \quad (3)''$$

It is beneficial that an inner focus lens system having the basic configuration I and an inner focus lens system having the basic configuration II, like the inner focus lens systems according to Embodiments 1 to 5, satisfy the following condition (4):

$$0.1 < |f_{OIS}/f_A| < 2 \ldots \quad (4)$$

where $f_{OIS}$ is the focal length of the image blur compensating lens unit, and $f_A$ is the focal length of the entire inner focus lens system.

The condition (4) sets forth the ratio of the focal length of the image blur compensating lens unit to the focal length of the entire inner focus lens system. When the value goes below the lower limit of the condition (4), the optical power of the image blur compensating lens unit becomes excessively strong, which makes it difficult to suppress occurrence of decentering coma aberration associated with image blur compensation. When the value exceeds the upper limit of the condition (4), the optical power of the image blur compensating lens unit becomes excessively weak, and the amount of movement of the image blur compensating lens unit in the perpendicular direction in image blur compensation is increased, which makes it difficult to achieve size reduction of the inner focus lens system.

When at least one of the following conditions (4)' and (4)'' is satisfied, the above-mentioned effect is achieved more successfully.

$$0.2 < |f_{OIS}/f_A| \quad (4)'$$

$$|f_{OIS}/f_A| < 0.4 \quad (4)''$$

It is beneficial that an inner focus lens system having the basic configuration I and an inner focus lens system having the basic configuration II, like the inner focus lens systems according to Embodiments 1 to 5, satisfy the following condition (5):

$$0.1 < |f_{OIS}/f_{F1}| < 1.2 \quad (5)$$

where $f_{OIS}$ is the focal length of the image blur compensating lens unit, and $f_{F1}$ is the focal length of the first focusing lens unit.

The condition (5) sets forth the ratio of the focal length of the image blur compensating lens unit to the focal length of the first focusing lens unit. When the value goes below the lower limit of the condition (5), the optical power of the image blur compensating lens unit becomes excessively strong, which makes it difficult to suppress occurrence of decentering coma aberration associated with image blur compensation. When the value exceeds the upper limit of the condition (5), the optical power of the image blur compensating lens unit becomes excessively weak, and the amount of movement of the image blur compensating lens unit in the perpendicular direction in image blur compensation is increased, which makes it difficult to achieve size reduction of the inner focus lens system.

When at least one of the following conditions (5)' and (5)" is satisfied, the above-mentioned effect is achieved more successfully.

$$0.3 < |f_{OIS}/f_{F1}| \tag{5}'$$

$$|f_{OIS}/f_{F1}| < 0.5 \tag{5}''$$

It is beneficial that an inner focus lens system having the basic configuration I and an inner focus lens system having the basic configuration II, like the inner focus lens systems according to Embodiments 1 to 5, satisfy the following condition (6):

$$0.3 < |f_{G1}/f_{F1}| < 1.1 \tag{6}$$

where
$f_{G1}$ is the focal length of the first lens unit, and
$f_{F1}$ is the focal length of the first focusing lens unit.

The condition (6) sets forth the ratio of the focal length of the first lens unit to the focal length of the first focusing lens unit. When the value goes below the lower limit of the condition (6), the optical power of the first lens unit becomes excessively strong, which makes it difficult to suppress occurrences of spherical aberration and axial chromatic aberration. When the value exceeds the upper limit of the condition (6), the optical power of the first focusing lens unit becomes excessively strong, which makes it difficult to suppress variation in astigmatism associated with focusing.

When at least one of the following conditions (6)' and (6)" is satisfied, the above-mentioned effect is achieved more successfully.

$$0.6 < |f_{G1}/f_{F1}| \tag{6}'$$

$$|f_{G1}/f_{F1}| < 1.0 \tag{6}''$$

It is beneficial that an inner focus lens system having the basic configuration I and an inner focus lens system having the basic configuration II, like the inner focus lens systems according to Embodiments 1 to 5, satisfy the following condition (7):

$$|TH_{F2}/f_A| < 0.05 \tag{7}$$

where
$TH_{F2}$ is the optical axial thickness of the second focusing lens unit, and
$f_A$ is the focal length of the entire inner focus lens system.

The condition (7) sets forth the ratio of the optical axial thickness of the second focusing lens unit to the focal length of the entire inner focus lens system. When the value exceeds the upper limit of the condition (7), the optical axial thickness of the second focusing lens unit is excessively increased, which makes it difficult to suppress variation in axial chromatic aberration associated with focusing.

When the following condition (7)' is satisfied, the above-mentioned effect is achieved more successfully.

$$|TH_{F2}/f_A| < 0.04 \tag{7}'$$

For example, in an inner focus lens system having the basic configuration II like the inner focus lens systems according to Embodiments 1 to 5, the following condition (8) is satisfied:

$$L_A/f_A < 1.2 \tag{8}$$

where
$L_A$ is the overall length of the inner focus lens system (the distance from an object side surface of the first positive lens element to the image surface), and $f_A$ is the focal length of the entire inner focus lens system.

The condition (8) sets forth the ratio of the overall length of the inner focus lens system to the focal length of the entire inner focus lens system. When the value exceeds the upper limit of the condition (8), the focal length of the entire inner focus lens system becomes excessively short, which makes it difficult to suppress astigmatism.

When the following condition (8)' is satisfied, the above-mentioned effect is achieved more successfully.

$$L_A/f_A < 1.1 \tag{8}'$$

The individual lens units constituting the inner focus lens systems according to Embodiments 1 to 5 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved.

The individual lens elements constituting the inner focus lens systems according to Embodiments 1 to 5 may be lens elements each prepared by cementing a transparent resin layer made of ultraviolet-ray curable resin on a surface of a glass lens element. Because the optical power of the transparent resin layer is weak, the glass lens element and the transparent resin layer are totally counted as one lens element. In the same manner, when a lens element that is similar to a plane plate is located, the lens element that is similar to a plane plate is not counted as one lens element because the optical power of the lens element that is similar to a plane plate is weak.

Embodiment 6

Figure 16:
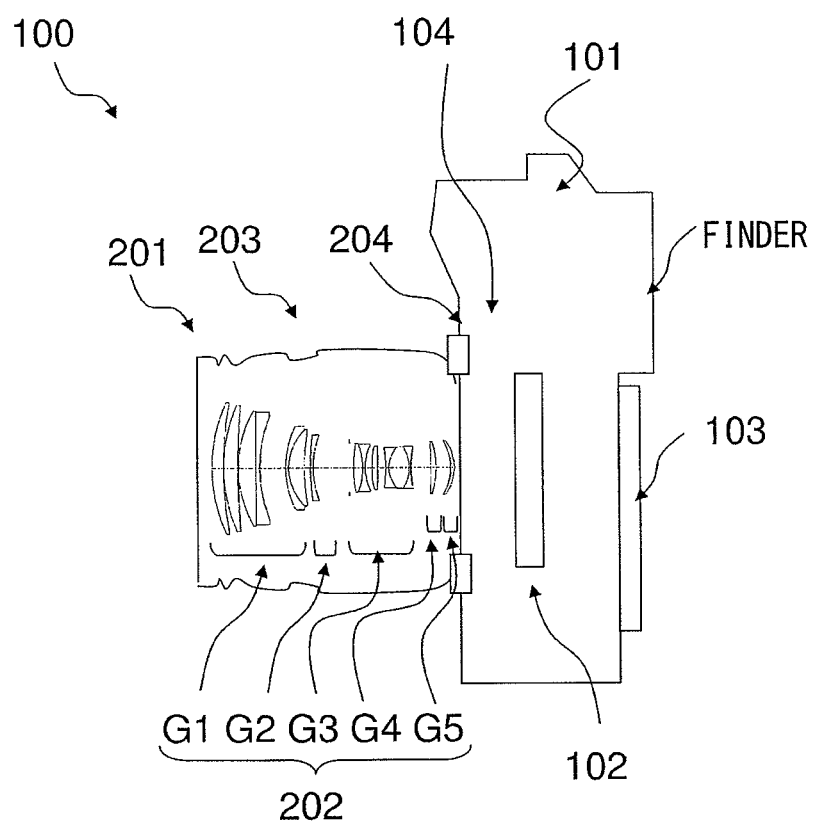
FIG. 16 is a schematic construction diagram of an interchangeable-lens type digital camera system according to Embodiment 6.

FIG. 16 is a schematic construction diagram of an interchangeable-lens type digital camera system according to Embodiment 6.

The interchangeable-lens type digital camera system 100 according to Embodiment 6 includes a camera body 101, and an interchangeable lens apparatus 201 which is detachably connected to the camera body 101.

The camera body 101 includes: an image sensor 102 which receives an optical image formed by an inner focus lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: an inner focus lens system 202 according to any of Embodiments 1 to 5; a lens barrel 203 which holds the inner focus lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 16, the inner focus lens system according to Embodiment 1 is employed as the inner focus lens system 202.

In Embodiment 6, since the inner focus lens system 202 according to any of Embodiments 1 to 5 is employed, a compact interchangeable lens apparatus having excellent imaging performance can be realized at low cost. Moreover, size reduction and cost reduction of the entire camera system 100 according to Embodiment 6 can be achieved.

In the interchangeable-lens type digital camera system according to Embodiment 6, the inner focus lens systems according to Embodiments 1 to 5 are shown as the inner focus lens system 202, and the entire focusing range need not be used in these inner focus lens systems. That is, in accordance with a desired focusing range, a range where satisfactory optical performance is obtained may exclusively be used.

An imaging device comprising each of the inner focus lens systems according to Embodiments 1 to 5, and an image sensor such as a CCD or a CMOS may be applied to a camera for a mobile terminal device such as a smart-phone, a surveillance camera in a surveillance system, a Web camera, a vehicle-mounted camera or the like.

As described above, Embodiment 6 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the inner focus lens systems according to Embodiments 1 to 5 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line.

FIGS. 2, 5, 8, 11, and 14 are longitudinal aberration diagrams of the inner focus lens systems according to Numerical Examples 1 to 5, respectively.

In each longitudinal aberration diagram, part (a) shows the aberration in an infinity in-focus condition, and part (b) shows the aberration in a close-object in-focus condition. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, and 15 are lateral aberration diagrams of an infinity in-focus condition of the inner focus lens systems according to Numerical Examples 1 to 5, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

In the inner focus lens system according to each of Numerical Examples 1 to 5, the amount of movement of the image blur compensating lens unit in a direction perpendicular to the optical axis in an image blur compensation state in an infinity in-focus condition is 0.65 mm.

When the shooting distance is infinity, the amount of image decentering in a case that the inner focus lens system inclines by 0.4° is equal to the amount of image decentering in a case that the image blur compensating lens unit displaces in parallel by the above-mentioned value in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of an inner focus lens system is the same, the amount of parallel translation required for image blur compensation decreases with decreasing focal length of the entire inner focus lens system. Thus, at arbitrary focus positions, sufficient image blur compensation can be performed for image blur compensation angles up to 0.4° without degrading the imaging characteristics.

Numerical Example 1

The inner focus lens system of Numerical Example 1 corresponds to Embodiment 1 shown in FIG. 1. Table 1 shows the surface data of the inner focus lens system of Numerical Example 1. Table 2 shows the various data.

TABLE 1

(Surface data)

| Surface number | r | d | nd | vd |
| --- | --- | --- | --- | --- |
| Objet surface | ∞ | Variable | | |
| 1 | 61.56450 | 4.69240 | 1.92286 | 20.9 |
| 2 | 135.49310 | 0.20000 | | |
| 3 | 62.51620 | 5.79680 | 1.43700 | 95.1 |
| 4 | 320.40420 | 0.20000 | | |
| 5 | 46.67900 | 7.04750 | 1.59349 | 67.0 |
| 6 | 3705.03860 | 1.60000 | 1.90366 | 31.3 |

TABLE 1-continued (Surface data)

| Surface number | r | d | nd | vd |
|---|---|---|---|---|
| 7 | 62.15600 | 10.12130 | | |
| 8 | 37.44560 | 1.30000 | 2.00069 | 25.5 |
| 9 | 21.72900 | 6.30300 | 1.43700 | 95.1 |
| 10 | 97.59980 | Variable | | |
| 11 | 122.06850 | 1.05000 | 1.62041 | 60.3 |
| 12 | 38.54290 | Variable | | |
| 13(Diaphragm) | ∞ | 2.00000 | | |
| 14 | 60.39180 | 3.59230 | 1.77250 | 49.6 |
| 15 | −27.34940 | 1.00000 | 1.74077 | 27.8 |
| 16 | 20.39520 | 2.66240 | | |
| 17 | 34.47190 | 2.51550 | 1.88300 | 40.8 |
| 18 | −132.94540 | 3.03970 | | |
| 19 | −44.93320 | 1.20000 | 1.92286 | 20.9 |
| 20 | 12.17350 | 8.12330 | 1.84666 | 23.8 |
| 21 | −15.45310 | 0.80000 | 1.80420 | 46.5 |
| 22 | 46.88660 | Variable | | |
| 23 | −254.96420 | 2.11870 | 1.92286 | 20.9 |
| 24 | −35.79630 | Variable | | |
| 25 | −21.07090 | 1.59920 | 1.48749 | 70.4 |
| 26 | −17.37880 | 35.34770 | | |
| 27 | ∞ | (BF) | | |
| Image surface | ∞ | | | |

TABLE 2

(Various data)

| | Infinity | Close |
|---|---|---|
| Focal length | 146.2142 | 139.0971 |
| F-number | 2.91065 | 2.92693 |
| View angle | 4.1995 | 3.5203 |
| Image height | 10.8150 | 10.8150 |
| Overall length of lens system | 132.5800 | 132.5800 |
| BF | 0.00000 | 0.00000 |
| d0 | ∞ | 1000.0000 |
| d10 | 2.4270 | 12.7922 |
| d12 | 14.2504 | 3.8852 |
| d22 | 7.9192 | 7.7636 |
| d24 | 5.6736 | 5.8292 |
| Entrance pupil position | 139.4733 | 156.0545 |
| Exit pupil position | −104.8342 | −104.0063 |
| Front principal points position | 81.7589 | 62.3095 |
| Back principal points position | −13.6347 | −27.4285 |

Zoom lens unit data

| Lens unit | Initial surface No. | Focal length | Overall length of lens unit | Front principal points position | Back principal points position |
|---|---|---|---|---|---|
| 1 | 1 | 77.46029 | 37.26100 | −15.80039 | 1.06001 |
| 2 | 11 | −91.23168 | 1.05000 | 0.95158 | 1.35046 |
| 3 | 13 | −33.64340 | 24.93320 | 15.30012 | 23.10908 |
| 4 | 23 | 44.91530 | 2.11870 | 1.27589 | 2.29783 |
| 5 | 25 | 178.16252 | 1.59920 | 5.37292 | 6.03067 |

Numerical Example 2

The inner focus lens system of Numerical Example 2 corresponds to Embodiment 2 shown in FIG. 4. Table 3 shows the surface data of the inner focus lens system of Numerical Example 2. Table 4 shows the various data.

TABLE 3

(Surface data)

| Surface number | r | d | nd | vd |
|---|---|---|---|---|
| Object surface | ∞ | Variable | | |
| 1 | 57.12540 | 5.87100 | 1.84666 | 23.8 |
| 2 | 160.83630 | 12.90360 | | |
| 3 | 56.28260 | 3.92010 | 1.49700 | 81.6 |
| 4 | 120.12150 | 0.20000 | | |
| 5 | 38.20590 | 6.79070 | 1.59349 | 67.0 |
| 6 | 763.59730 | 1.60000 | 2.00100 | 29.1 |
| 7 | 32.83580 | 5.67120 | | |
| 8 | 44.70900 | 1.30000 | 1.74950 | 35.0 |
| 9 | 27.64100 | 5.87940 | 1.49700 | 81.6 |
| 10 | 253.45580 | Variable | | |
| 11 | 176.05290 | 1.05000 | 1.62041 | 60.3 |
| 12 | 42.89340 | Variable | | |
| 13(Diaphragm) | ∞ | 2.00000 | | |
| 14 | 41.49390 | 8.54550 | 1.77250 | 49.6 |
| 15 | −31.11700 | 1.00000 | 1.74077 | 27.8 |
| 16 | 20.95330 | 2.93600 | | |
| 17 | 39.48730 | 3.12930 | 1.88300 | 40.8 |
| 18 | −123.85680 | 3.42830 | | |
| 19 | −53.33040 | 1.20000 | 1.92286 | 20.9 |
| 20 | 15.79770 | 9.51370 | 1.84666 | 23.8 |
| 21 | −22.77160 | 0.80000 | 1.80420 | 46.5 |
| 22 | 42.74800 | Variable | | |
| 23 | −159.61710 | 3.66030 | 1.92286 | 20.9 |
| 24 | −32.12560 | Variable | | |
| 25 | −23.29870 | 4.86340 | 1.59349 | 67.0 |
| 26 | −20.73320 | 39.41020 | | |
| 27 | ∞ | (BF) | | |
| Image surface | ∞ | | | |

TABLE 4

(Various data)

| | Infinity | Close |
|---|---|---|
| Focal length | 146.2049 | 151.8434 |
| F-number | 2.91046 | 2.92990 |
| View angle | 4.2181 | 3.4283 |
| Image height | 10.8150 | 10.8150 |
| Overall length of lens system | 158.5790 | 158.5796 |
| BF | 0.00000 | 0.00000 |
| d0 | ∞ | 1000.0000 |
| d10 | 2.0000 | 15.4977 |
| d12 | 17.1921 | 3.6949 |
| d22 | 7.2754 | 7.2164 |
| d24 | 6.4388 | 6.4979 |
| Entrance pupil position | 145.2087 | 164.4178 |
| Exit pupil position | −152.4921 | −151.8204 |
| Front principal points position | 151.2416 | 136.7664 |
| Back principal points position | 12.3795 | −16.6325 |

Zoom lens unit data

| Lens unit | Initial surface No. | Focal length | Overall length of lens unit | Front principal points position | Back principal points position |
|---|---|---|---|---|---|
| 1 | 1 | 97.29559 | 44.13600 | −16.31923 | 0.60322 |
| 2 | 11 | −91.68463 | 1.05000 | 0.85931 | 1.25936 |
| 3 | 13 | −52.45861 | 32.55280 | 32.27842 | 38.33714 |
| 4 | 23 | 42.99028 | 3.66030 | 2.35084 | 4.13345 |
| 5 | 25 | 185.95998 | 4.86340 | 16.24645 | 19.32090 |

Numerical Example 3

The inner focus lens system of Numerical Example 3 corresponds to Embodiment 3 shown in FIG. 7. Table 5 shows the surface data of the inner focus lens system of Numerical Example 3. Table 6 shows the various data.

TABLE 5

(Surface data)

| Surface number | r | d | nd | vd |
|---|---|---|---|---|
| Object surface | ∞ | Variable | | |
| 1 | 59.25990 | 5.36050 | 1.84666 | 23.8 |
| 2 | 155.02690 | 15.79890 | | |
| 3 | 63.53140 | 4.07930 | 1.49700 | 81.6 |
| 4 | 205.58420 | 0.20000 | | |
| 5 | 39.85700 | 6.49750 | 1.59349 | 67.0 |
| 6 | −2319.83600 | 1.60000 | 2.00100 | 29.1 |
| 7 | 32.38380 | 6.45730 | | |
| 8 | 39.13740 | 1.30000 | 1.51742 | 52.1 |
| 9 | 25.60680 | 6.24720 | 1.49700 | 81.6 |
| 10 | 213.23710 | Variable | | |
| 11 | 136.08920 | 1.58280 | 1.58913 | 61.3 |
| 12 | −1015.75810 | 1.05000 | 1.69680 | 55.5 |
| 13 | 45.79320 | Variable | | |
| 14(Diaphragm) | ∞ | 2.00000 | | |
| 15 | 37.64020 | 4.25240 | 1.77250 | 49.6 |
| 16 | −36.06540 | 1.00000 | 1.72825 | 28.3 |
| 17 | 19.81770 | 3.04910 | | |
| 18 | 37.18010 | 2.61940 | 1.88300 | 40.8 |
| 19 | −146.80140 | 2.18370 | | |
| 20 | −74.83170 | 1.20000 | 1.92286 | 20.9 |
| 21 | 21.95330 | 8.33650 | 1.84666 | 23.8 |
| 22 | −28.87900 | 0.80000 | 1.80420 | 46.5 |
| 23 | 36.61900 | Variable | | |
| 24 | −210.39000 | 4.12680 | 1.84666 | 23.8 |
| 25 | −23.15330 | 1.00000 | 1.48749 | 70.4 |
| 26 | −67.67760 | Variable | | |
| 27 | −22.47360 | 2.87620 | 1.48749 | 70.4 |
| 28 | −19.39190 | 32.98870 | | |
| 29 | ∞ | (BF) | | |
| Image surface | ∞ | | | |

TABLE 6

(Various data)

| | Infinity | Close |
|---|---|---|
| Focal length | 146.2121 | 139.7634 |
| F-number | 2.91041 | 2.93601 |
| View angle | 4.2065 | 3.4912 |
| Image height | 10.8150 | 10.8150 |
| Overall length of lens system | 149.5919 | 149.5919 |
| BF | 0.00000 | 0.00000 |
| d0 | ∞ | 1000.0000 |
| d10 | 2.0000 | 13.8501 |
| d13 | 15.4075 | 3.5574 |
| d23 | 7.7199 | 7.3199 |
| d26 | 7.8582 | 8.2582 |
| Entrance pupil position | 153.1459 | 168.9972 |
| Exit pupil position | −103.9533 | −102.4342 |
| Front principal points position | 93.7195 | 68.9810 |
| Back principal points position | 3.3856 | −11.1400 |

Zoom lens unit data

| Lens unit | Initial surface No. | Focal length | Overall length of lens unit | Front principal points position | Back principal points position |
|---|---|---|---|---|---|
| 1 | 1 | 88.84200 | 47.54070 | −3.09370 | 7.89552 |
| 2 | 11 | −91.84874 | 2.63280 | 2.26667 | 3.26888 |
| 3 | 14 | −58.14058 | 25.44110 | 24.33757 | 30.32740 |
| 4 | 24 | 53.07940 | 5.12680 | 2.94265 | 5.18921 |
| 5 | 27 | 222.14505 | 2.87620 | 10.79809 | 12.19359 |

Numerical Example 4

The inner focus lens system of Numerical Example 4 corresponds to Embodiment 4 shown in FIG. 10. Table 7 shows the surface data of the inner focus lens system of Numerical Example 4. Table 8 shows the various data.

TABLE 7

(Surface data)

| Surface number | r | d | nd | vd |
|---|---|---|---|---|
| Object surface | ∞ | Variable | | |
| 1 | 57.30010 | 5.66200 | 1.84666 | 23.8 |
| 2 | 164.89120 | 2.50290 | | |
| 3 | 52.36090 | 4.67070 | 1.49700 | 81.6 |
| 4 | 111.10980 | 0.20000 | | |
| 5 | 36.03920 | 7.93970 | 1.59282 | 68.6 |
| 6 | 401.76890 | 1.60000 | 1.80610 | 33.3 |
| 7 | 28.73000 | 7.03090 | | |
| 8 | 32.91070 | 1.30000 | 1.84666 | 23.8 |
| 9 | 21.50030 | 6.51900 | 1.49700 | 81.6 |
| 10 | 93.72630 | Variable | | |
| 11 | 143.16010 | 1.05000 | 1.60311 | 60.7 |
| 12 | 35.59520 | Variable | | |
| 13(Diaphragm) | ∞ | 2.00000 | | |
| 14 | 53.64380 | 3.74480 | 1.77250 | 49.6 |
| 15 | −31.41830 | 1.00000 | 1.68893 | 31.2 |
| 16 | 21.63850 | 2.52430 | | |
| 17 | 31.47310 | 2.58880 | 1.88300 | 40.8 |
| 18 | −325.84920 | 2.42530 | | |
| 19 | −60.81460 | 1.20000 | 1.92286 | 20.9 |
| 20 | 14.13680 | 8.27140 | 1.84666 | 23.8 |
| 21 | −50.90930 | 0.80000 | 1.80420 | 46.5 |
| 22 | 55.71660 | Variable | | |
| 23 | 134.00100 | 3.87560 | 1.84666 | 23.8 |
| 24 | −21.58420 | 1.00000 | 1.48749 | 70.4 |
| 25 | −111.32940 | Variable | | |
| 26 | −16.00760 | 1.84390 | 1.80420 | 46.5 |
| 27 | −16.38590 | 18.77010 | | |
| 28 | ∞ | (BF) | | |
| Image surface | ∞ | | | |

TABLE 8

(Various data)

| | Infinity | Close |
|---|---|---|
| Focal length | 104.4078 | 103.3694 |
| F-number | 2.08038 | 2.09468 |
| View angle | 5.8884 | 5.0027 |
| Image height | 10.8150 | 10.8150 |
| Overall length of lens system | 113.5699 | 113.5701 |
| BF | 0.00000 | 0.00000 |
| d0 | ∞ | 1000.0000 |
| d10 | 2.6009 | 11.0803 |
| d12 | 12.7298 | 4.2504 |
| d22 | 4.4078 | 4.0078 |
| d25 | 5.3120 | 5.7122 |
| Entrance pupil position | 126.6710 | 139.8437 |
| Exit pupil position | −72.5960 | −71.0638 |
| Front principal points position | 80.9209 | 65.1679 |
| Back principal points position | 9.1629 | −0.8489 |

Zoom lens unit data

| Lens unit | Initial surface No. | Focal length | Overall length of lens unit | Front principal points position | Back principal points position |
|---|---|---|---|---|---|
| 1 | 1 | 75.27599 | 37.42520 | −13.34556 | 2.74340 |
| 2 | 11 | −78.83944 | 1.05000 | 0.87493 | 1.26754 |
| 3 | 13 | −66.50676 | 24.55460 | 21.98558 | 28.42133 |
| 4 | 23 | 37.04790 | 4.87560 | 1.73956 | 3.81801 |
| 5 | 26 | 735.26748 | 1.84390 | 36.88007 | 39.59554 |

Numerical Example 5

The inner focus lens system of Numerical Example 5 corresponds to Embodiment 5 shown in FIG. 13. Table 9 shows the surface data of the inner focus lens system of Numerical Example 5. Table 10 shows the various data.

TABLE 9

(Surface data)

| Surface number | r | d | nd | vd |
|---|---|---|---|---|
| Object surface | ∞ | Variable | | |
| 1 | 50.97710 | 6.29410 | 1.84666 | 23.8 |
| 2 | 141.55960 | 12.79400 | | |
| 3 | 51.53990 | 4.26990 | 1.49700 | 81.6 |
| 4 | 131.37540 | 0.20000 | | |
| 5 | 33.06630 | 7.08600 | 1.49700 | 81.6 |
| 6 | 14424.79050 | 1.60000 | 2.00069 | 25.5 |
| 7 | 27.84500 | 5.82710 | | |
| 8 | 41.88650 | 3.28650 | 1.59349 | 67.0 |
| 9 | 212.41860 | Variable | | |
| 10 | 120.59720 | 1.05000 | 1.77250 | 49.6 |
| 11 | 43.16490 | Variable | | |
| 12(Diaphragm) | ∞ | 2.00000 | | |
| 13 | 40.69110 | 4.42950 | 1.80420 | 46.5 |
| 14 | −26.19720 | 1.00000 | 1.78472 | 25.7 |
| 15 | 20.14660 | 2.81350 | | |
| 16 | 35.07530 | 2.75520 | 1.88300 | 40.8 |
| 17 | −159.39370 | 2.26040 | | |
| 18 | −64.84320 | 1.20000 | 1.92286 | 20.9 |
| 19 | 15.96920 | 10.02450 | 1.84666 | 23.8 |
| 20 | −16.17400 | 0.80000 | 1.80420 | 46.5 |
| 21 | 34.36220 | Variable | | |
| 22 | 2369.59610 | 2.84680 | 1.84666 | 23.8 |
| 23 | −23.37970 | 1.00000 | 1.48749 | 70.4 |
| 24 | −104.02680 | Variable | | |
| 25 | −24.71940 | 1.83690 | 1.48749 | 70.4 |
| 26 | −18.46640 | Variable | | |
| 27 | ∞ | (BF) | | |
| Image surface | ∞ | | | |

TABLE 10

(Various data)

| | Infinity | Close |
|---|---|---|
| Focal length | 146.2137 | 138.0775 |
| F-number | 2.91029 | 2.93167 |
| View angle | 4.2187 | 3.5357 |
| Image height | 10.8150 | 10.8150 |
| Overall length of lens system | 138.5579 | 138.5583 |
| BF | 0.00000 | 0.00000 |
| d0 | ∞ | 1000.0000 |
| d9 | 2.0000 | 12.4283 |
| d11 | 14.1607 | 3.7327 |
| d21 | 5.2604 | 4.9735 |
| d24 | 11.9632 | 11.7245 |
| d26 | 29.7992 | 30.3249 |
| Entrance pupil position | 140.5462 | 155.4503 |
| Exit pupil position | −102.7191 | −100.8140 |
| Front principal points position | 78.6728 | 55.4456 |
| Back principal points position | −7.6370 | −20.2541 |

Zoom lens unit data

| Lens unit | Initial surface No. | Focal length | Overall length of lens unit | Front principal points position | Back principal points position |
|---|---|---|---|---|---|
| 1 | 1 | 82.20456 | 41.35760 | −9.16048 | 3.16193 |
| 2 | 10 | −87.54301 | 1.05000 | 0.92809 | 1.38219 |
| 3 | 12 | −41.99048 | 27.28310 | 21.09058 | 28.88220 |
| 4 | 22 | 49.15068 | 3.84680 | 1.67028 | 3.30058 |
| 5 | 25 | 136.59895 | 1.83690 | 4.45310 | 5.16354 |

The following Table 11 shows the corresponding values to the individual conditions in the inner focus lens systems of each of Numerical Examples.

TABLE 11

(Values corresponding to conditions)

| | Numerical Example | | | | |
|---|---|---|---|---|---|
| Condition | 1 | 2 | 3 | 4 | 5 |
| (1) $vd_{L1}$ | 20.880 | 23.780 | 23.780 | 23.780 | 23.780 |
| (2) $nd_{L1}$ | 1.923 | 1.847 | 1.847 | 1.847 | 1.847 |
| (3) $|f_{F1}/f_{F2}|$ | 2.031 | 2.133 | 1.730 | 2.128 | 1.781 |
| (4) $|f_{OIS}/f_A|$ | 0.214 | 0.234 | 0.231 | 0.312 | 0.224 |
| (5) $|f_{OIS}/f_{F1}|$ | 0.342 | 0.373 | 0.368 | 0.414 | 0.374 |
| (6) $|f_{G1}/f_{F1}|$ | 0.849 | 1.061 | 0.967 | 0.955 | 0.939 |
| (7) $|TH_{F2}/f_A|$ | 0.016 | 0.023 | 0.034 | 0.043 | 0.013 |
| (8) $L_A/f_A$ | 0.907 | 1.085 | 1.023 | 1.088 | 0.948 |

The present disclosure is applicable to a digital still camera, a digital video camera, a camera for a mobile terminal device such as a smart-phone, a surveillance camera in a surveillance system, a Web camera, a vehicle-mounted camera or the like. In particular, the present disclosure is applicable to a photographing optical system where high image quality is required like in a digital still camera system or a digital video camera system.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. An inner focus lens system, in order from an object side to an image side, comprising a first lens unit, and subsequent lens units, wherein
   the first lens unit is fixed with respect to an image surface in focusing from an infinity in-focus condition to a close-object in-focus condition,
   the first lens unit includes: a first positive lens element being located closest to the object side, and having positive optical power; and a second positive lens element having positive optical power,
   the subsequent lens units include only a first focusing lens unit located closest to the object side, and a second focusing lens unit, as focusing lens units that move along an optical axis in the focusing,
   at least one of the first focusing lens unit and the second focusing lens unit is composed of two or less lens elements, and
   the subsequent lens units include an image blur compensating lens unit that moves in a direction perpendicular to the optical axis to optically compensate image blur.

2. The inner focus lens system as claimed in claim 1, wherein the following condition (1) is satisfied:

$$vd_{L1} < 35 \qquad (1)$$

where
$vd_{L1}$ is an Abbe number to the d-line of the first positive lens element.

3. The inner focus lens system as claimed in claim 1, wherein the following condition (2) is satisfied:

$$nd_{L1} > 1.8 \quad (2)$$

where
$nd_{L1}$ is a refractive index to the d-line of the first positive lens element.

4. The inner focus lens system as claimed in claim 1, wherein the following condition (3) is satisfied:

$$1 < |f_{F1}/f_{F2}| < 3 \quad (3)$$

where
$f_{F1}$ is a focal length of the first focusing lens unit, and
$f_{F2}$ is a focal length of the second focusing lens unit.

5. The inner focus lens system as claimed in claim 1, wherein the following condition (4) is satisfied:

$$0.1 < |f_{OIS}/f_A| < 2 \quad (4)$$

where
$f_{OIS}$ is a focal length of the image blur compensating lens unit, and
$f_A$ is a focal length of the entire inner focus lens system.

6. The inner focus lens system as claimed in claim 1, wherein the following condition (5) is satisfied:

$$0.1 < |f_{OIS}/f_{F1}| < 1.2 \quad (5)$$

where
$f_{OIS}$ is a focal length of the image blur compensating lens unit, and
$f_{F1}$ is a focal length of the first focusing lens unit.

7. The inner focus lens system as claimed in claim 1, wherein the following condition (6) is satisfied:

$$0.3 < |f_{G1}/f_{F1}| < 1.1 \quad (6)$$

where
$f_{G1}$ is a focal length of the first lens unit, and
$f_{F1}$ is a focal length of the first focusing lens unit.

8. The inner focus lens system as claimed in claim 1, wherein the following condition (7) is satisfied:

$$|TH_{F2}/f_A| < 0.05 \quad (7)$$

where
$TH_{F2}$ is an optical axial thickness of the second focusing lens unit, and
$f_A$ is an focal length of the entire inner focus lens system.

9. An interchangeable lens apparatus comprising:
an inner focus lens system as claimed in claim 1; and
a lens mount section which is connectable to a camera body including an image sensor for receiving an optical image formed by the inner focus lens system and converting the optical image into an electric image signal.

10. A camera system comprising:
an interchangeable lens apparatus including an inner focus lens system as claimed in claim 1; and
a camera body which is detachably connected to the interchangeable lens apparatus via a camera mount section, and includes an image sensor for receiving an optical image formed by the inner focus lens system and converting the optical image into an electric image signal.

11. An inner focus lens system, in order from an object side to an image side, comprising a first lens unit, and subsequent lens units, wherein
the first lens unit is fixed with respect to an image surface in focusing from an infinity in-focus condition to a close-object in-focus condition,
the first lens unit includes: a first positive lens element being located closest to the object side, and having positive optical power; and a second positive lens element having positive optical power,
the subsequent lens units include at least a first focusing lens unit located closest to the object side, and a second focusing lens unit, as focusing lens units that move along an optical axis in the focusing,
the subsequent lens units include an image blur compensating lens unit that moves in a direction perpendicular to the optical axis to optically compensate image blur, and
the following condition (8) is satisfied:

$$L_A/f_A < 1.2 \quad (8)$$

where
$L_A$ is an overall length of the inner focus lens system (a distance from an object side surface of the first positive lens element to the image surface), and
$f_A$ is a focal length of the entire inner focus lens system.

12. The inner focus lens system as claimed in claim 11, wherein the following condition (1) is satisfied:

$$vd_{L1} < 35 \quad (1)$$

where
$vd_{L1}$ is an Abbe number to the d-line of the first positive lens element.

13. The inner focus lens system as claimed in claim 11, wherein the following condition (2) is satisfied:

$$nd_{L1} > 1.8 \quad (2)$$

where
$nd_{L1}$ is a refractive index to the d-line of the first positive lens element.

14. The inner focus lens system as claimed in claim 11, wherein the following condition (3) is satisfied:

$$1 < |f_{F1}/f_{F2}| < 3 \quad (3)$$

where
$f_{F1}$ is a focal length of the first focusing lens unit, and
$f_{F2}$ is a focal length of the second focusing lens unit.

15. The inner focus lens system as claimed in claim 11, wherein the following condition (4) is satisfied:

$$0.1 < |f_{OIS}/f_A| < 2 \quad (4)$$

where
$f_{OIS}$ is a focal length of the image blur compensating lens unit, and
$f_A$ is the focal length of the entire inner focus lens system.

16. The inner focus lens system as claimed in claim 11, wherein the following condition (5) is satisfied:

$$0.1 < |f_{OIS}/f_{F1}| < 1.2 \quad (5)$$

where
$f_{OIS}$ is a focal length of the image blur compensating lens unit, and
$f_{F1}$ is a focal length of the first focusing lens unit.

17. The inner focus lens system as claimed in claim 11, wherein the following condition (6) is satisfied:

$$0.3 < |f_{G1}/f_{F1}| < 1.1 \quad (6)$$

where
$f_{G1}$ is a focal length of the first lens unit, and
$f_{F1}$ is a focal length of the first focusing lens unit.

18. The inner focus lens system as claimed in claim 11, wherein the following condition (7) is satisfied:

$$|TH_{F2}/f_A| < 0.05 \quad (7)$$

where $TH_{F2}$ is an optical axial thickness of the second focusing lens unit, and $f_A$ is the focal length of the entire inner focus lens system.

19. An interchangeable lens apparatus comprising:

an inner focus lens system as claimed in claim 11; and a lens mount section which is connectable to a camera body including an image sensor for receiving an optical image formed by the inner focus lens system and converting the optical image into an electric image signal.

20. A camera system comprising:

an interchangeable lens apparatus including an inner focus lens system as claimed in claim 11; and a camera body which is detachably connected to the interchangeable lens apparatus via a camera mount section, and includes an image sensor for receiving an optical image formed by the inner focus lens system and converting the optical image into an electric image signal.

* * * * *